(12) United States Patent
Kim et al.

(10) Patent No.: US 10,524,018 B2
(45) Date of Patent: Dec. 31, 2019

(54) APPARATUS AND METHOD FOR DISPLAYING IMAGE

(71) Applicant: SAMSUNG ELECTRONICS CO., LTD., Suwon-si (KR)

(72) Inventors: Bo-eun Kim, Seoul (KR); Sung-hyun Kim, Yongin-si (KR); Jong-in Lee, Seoul (KR); Yong-deok Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 15/494,030

(22) Filed: Apr. 21, 2017

(65) Prior Publication Data

US 2018/0063461 A1     Mar. 1, 2018

Related U.S. Application Data

(60) Provisional application No. 62/381,186, filed on Aug. 30, 2016.

(30) Foreign Application Priority Data

Nov. 10, 2016  (KR) .......................... 10-2016-0149562

(51) Int. Cl.
*H04N 5/44* (2011.01)
*G09G 3/20* (2006.01)
*H04N 5/232* (2006.01)
*H04N 21/431* (2011.01)
*H04N 21/81* (2011.01)

(52) U.S. Cl.
CPC ....... *H04N 21/8146* (2013.01); *G09G 3/2096* (2013.01); *H04N 5/23238* (2013.01); *H04N 21/431* (2013.01); *G09G 2320/068* (2013.01); *G09G 2354/00* (2013.01)

(58) Field of Classification Search
CPC .......................... H04N 5/23238; H04N 21/431
See application file for complete search history.

(56) References Cited

U.S. PATENT DOCUMENTS

| | | | |
|---|---|---|---|
| 8,830,142 B1 | 9/2014 | Kim et al. | |
| 2010/0045799 A1* | 2/2010 | Lei ..................... | G06K 9/00369 348/169 |
| 2016/0192009 A1* | 6/2016 | Sugio ................. | H04N 21/4756 725/32 |
| 2016/0255410 A1* | 9/2016 | Itoh .................. | H04N 21/25891 725/14 |

* cited by examiner

*Primary Examiner* — Mainul Hasan
(74) *Attorney, Agent, or Firm* — Sughrue Mion, PLLC

(57) ABSTRACT

An image display apparatus may include a display, and a processor configured to generate a viewpoint guide map based on at least one of viewing-history data of the 360-degree image and characteristics of the 360-degree image, generate a list of recommended viewpoints for the 360-degree image based on the viewpoint guide map, and control the display to display an image included in the 360-degree image corresponding to a viewpoint from among the list of recommended viewpoints.

16 Claims, 20 Drawing Sheets

APPARATUS AND METHOD FOR DISPLAYING IMAGE

CROSS-REFERENCE TO RELATED APPLICATIONS

This application claims priority from U.S. Provisional Application No. 62/381,186, filed on Aug. 30, 2016 in the US Patent Office, and Korean Patent Application No. 10-2016-0149562, filed on Nov. 10, 2016 in the Korean Intellectual Property Office, the disclosures of which are incorporated herein in their entireties by reference.

BACKGROUND

1. Field

Apparatuses and methods consistent with exemplary embodiments set forth herein relate to image display, and more particularly, to an image display apparatus and method for displaying a 360-degree image.

2. Description of the Related Art

An image display apparatus has a function of displaying an image to a user. The user may, for example, view broadcast network programs on the image display apparatus. The image display apparatus may display a broadcast program selected by a user from among broadcast signals transmitted from a broadcast network station. At present, many broadcast networks have made transitions from analog broadcasting to digital broadcasting.

In digital broadcasting, a digital image is transmitted along with a sound signal. Digital broadcasting is more resilient to external noise and thus data loss thereof is relatively low. Furthermore, digital broadcasting is advantageous in terms of error correction, has a high resolution, and provides a clearer picture compared to analog broadcasting. In addition, digital broadcasting may be serviced bi-directionally, unlike analog broadcasting.

Recently, smart televisions (TVs) having a digital broadcast function and providing various types of content and image display apparatuses capable of displaying a 360-degree image have been provided. A user may view a 360-degree image from various angles by moving his/her viewpoint. Since an area of the 360-degree image to be seen by the user varies according to the user's viewpoint, there is a need to develop a method of selecting an appropriate viewpoint when a 360-degree image is viewed.

SUMMARY

According to an aspect of an exemplary embodiment, an image display apparatus includes a display, and a processor configured to generate a viewpoint guide map based on at least one of viewing-history data of the 360-degree image and characteristics of the 360-degree image, generate a list of recommended viewpoints for the 360-degree image based on the viewpoint guide map, and control the display to display an image included in the 360-degree image corresponding to a viewpoint from among the list of recommended viewpoints.

The viewpoint guide map may correspond to at least one from among a plurality of frames of the 360-degree image.

The processor may control the display to display a user interface for selecting a reproduction mode, and generate the viewpoint guide map, in response to a user input for selecting the reproduction mode through the user interface.

The processor may select at least one viewing-history provider, based on at least one of a first characteristic of the 360-degree image and information regarding a user, obtain as the viewing-history data of the 360-degree image the list of recommended viewpoints generated in response to the at least one viewing-history provider viewing the 360-degree image, and generate the viewpoint guide map based on the viewing-history data of the 360-degree image.

The processor may determine a highlight area, based on at least one of information regarding a plurality of pixels of each of frames of the 360-degree image and information regarding a motion of an object detected in the 360-degree image, and generate the viewpoint guide map by setting a recommendation grade of the highlight area to be higher than recommendation grades of other areas.

The information regarding the plurality of pixels may include at least one from among colors, brightness, gradients, and directions of the gradients of the plurality of pixels of each of the frames of the 360-degree image. The information regarding the motion of the object detected in the 360-degree image may include at least one from among information regarding displacement of the object, information regarding change in size of the object, and information regarding time when the object appears in the 360-degree image.

The processor may generate a first guide map based on the viewing-history data of the 360-degree image, generate a second guide map based on the characteristics of the 360-degree image, and generate the viewpoint guide map by respectively applying weights to the first guide map and the second guide map.

The processor may determine the weights, based on at least one from among a distribution of recommendation grades in the first guide map, a second characteristic of the 360-degree image, and a cumulative viewing count of the 360-degree image.

When a first frame is switched to a second frame, the processor may determine a viewpoint to be recommended for the second frame, based on at least one of a point of a highest recommendation grade in a viewpoint guide map corresponding to the second frame and a distance between the point of the highest recommendation grade in the viewpoint guide map corresponding to the second frame and a point representing a viewpoint of the first frame.

When the 360-degree image is reproduced in response to a user's input, the processor may generate the viewpoint guide map based on the viewing-history data generated when the user views the 360-degree image and a second guide map generated based on the characteristics of the 360-degree image.

The processor may control the display to display a second image corresponding to a second viewpoint changed in response to a user input for changing viewpoints, and to display information representing a location of a third viewpoint of a recommendation grade higher than or equal to a threshold value in the viewpoint guide map as the third viewpoint of the recommendation grade higher than or equal to the threshold value is located outside the second image corresponding to the second viewpoint.

According to an aspect of another exemplary embodiment, an image display method of displaying a 360-degree image may include generating a viewpoint guide map based on at least one of viewing-history data of the 360-degree image and characteristics of the 360-degree image, generating a list of recommended viewpoints for the 360-degree image, based on the viewpoint guide map, and displaying an image included in the 360-degree image corresponding to a viewpoint from among the list of recommended viewpoints.

According to an aspect of another exemplary embodiment, a method may include obtaining a characteristic of a viewer of a panoramic image, obtaining a viewing history of a plurality of users who have the characteristic, the viewing history comprising a plurality of viewpoints associated with the plurality of users with regard to the panoramic image, generating a viewpoint guide map of the panoramic image based on the viewing history of the plurality of users, the viewpoint guide map comprising a recommended viewpoint for the panoramic image, and generating, via a processor, a partial image of the panoramic image, a viewpoint of the partial image coinciding with the recommended viewpoint for the panoramic image.

The viewpoint of the partial image may corresponds to a viewing angle of the partial image with regard to the panoramic image.

The panoramic image may be a 360-degree image.

The characteristic of the viewer may be one of an age, a sex, a residence, and an occupation.

The viewpoint guide map may be generated further based on characteristics of the panoramic image.

The characteristics of the panoramic image may include at least one of a location of an object of interest and a movement of the object of interest.

BRIEF DESCRIPTION OF THE DRAWINGS

The above and/or other aspects will become apparent and more readily appreciated from the following description of various exemplary embodiments, taken in conjunction with the accompanying drawings in which.

DETAILED DESCRIPTION

Figure 1:
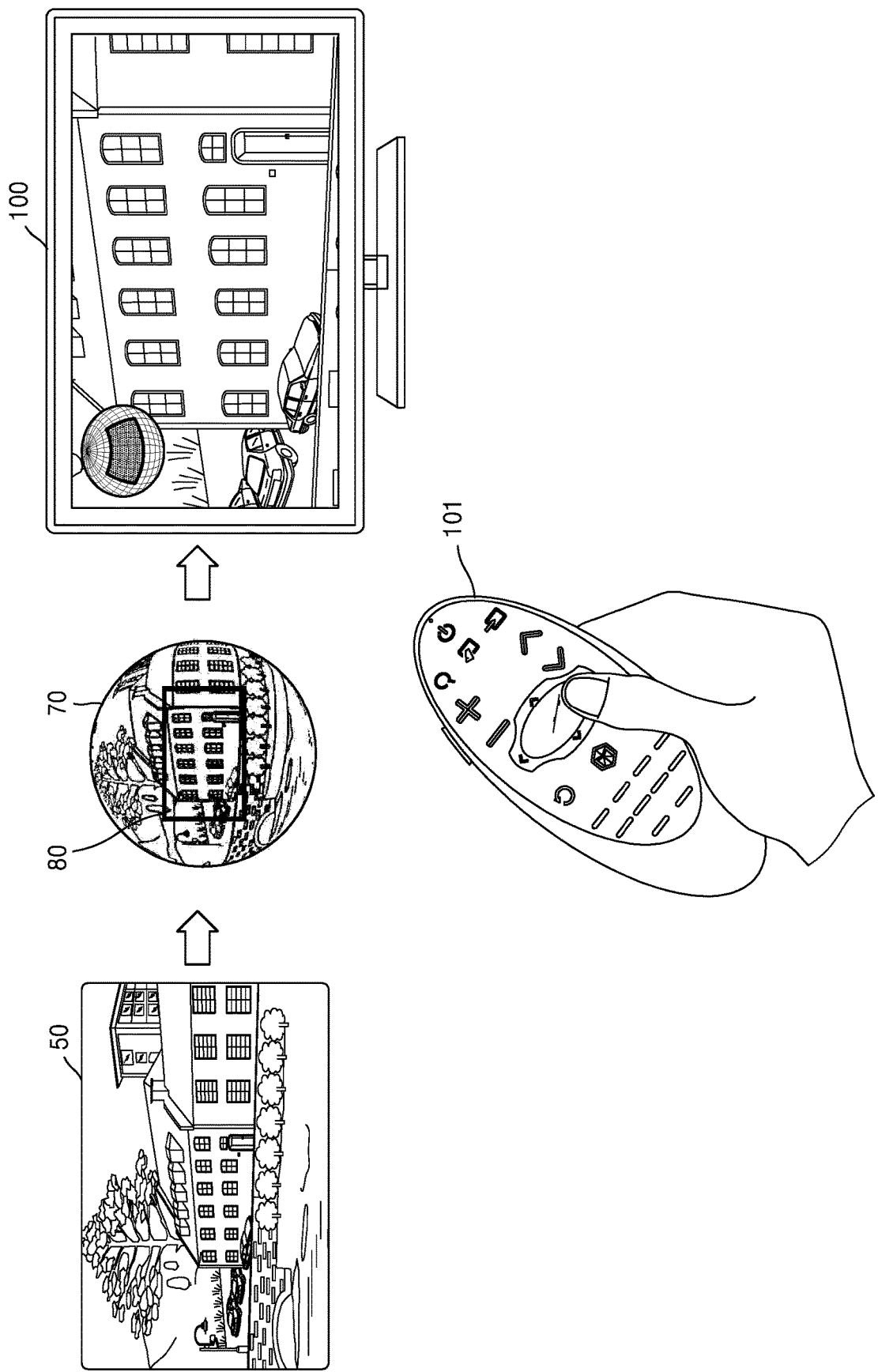
FIG. 1 is a diagram illustrating an image display apparatus for displaying a 360-degree image, according to an exemplary embodiment.

Hereinafter, various exemplary embodiments will be described in detail with reference to the accompanying drawings so that those of ordinary skill in the art can easily accomplish them. However, the present disclosure may be embodied in many different forms and should not be construed as being limited to the embodiments set forth herein. For clarity, parts that are not related to describing these exemplary embodiments are omitted in the drawings. Throughout the specification, like reference numerals are assigned to like elements.

In the present disclosure, general terms that have been widely used nowadays are selected, if possible, in consideration of functions mentioned in the present disclosure, but non-general terms may be selected according to the intentions of technicians in the this art, precedents, or new technologies, etc. Thus, the terms used herein should be defined not based on the names thereof but based on the meanings thereof and the whole context of the present disclosure.

The terminology used herein is for the purpose of describing particular exemplary embodiments only and is not intended to be limiting of the present disclosure. As used herein, the singular forms "a," "an." and "the" are intended to include the plural forms as well, unless the context clearly indicates otherwise. It will be understood that when an element or layer is referred to as being "connected to" another element or layer, the element or layer can be directly connected to another element or layer or can be electrically connected to another element or layer while having intervening elements or layers therebetween. It will be further understood that the terms "comprise," "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof.

In the present disclosure, and particularly, in the claims, the term "the" and demonstratives similar thereto may be understood to include both singular and plural forms. The operations of all methods described herein can be performed in an appropriate order unless otherwise indicated herein or otherwise clearly contradicted by context. The present disclosure is not limited by the orders in which the operations of the methods are described herein.

Throughout the present disclosure, the expression "in some embodiments," "in one embodiment," etc. may not necessarily indicate the same embodiment(s).

In the present disclosure, some elements may be represented using functional block components and various operations. All or some of the functional blocks may be realized by any number of hardware and/or software components configured to perform specified functions. For example, in the present disclosure, the functional blocks may be realized by one or more microprocessors or by circuit components configured to perform a certain function. For example, in the present disclosure, the functional blocks may be implemented with any programming or scripting language. The functional blocks may be embodied as an algorithm executed by one or more processors. Furthermore, the present disclosure may employ conventional techniques for electronics configuration, signal processing and/or data processing. The terms "mechanism," "element," "means," "configuration," etc. are used broadly and are not limited to mechanical or physical embodiments.

Furthermore, the lines or connecting elements shown in the appended drawings are intended to represent exemplary functional relationships and/or physical or logical couplings between various elements. It should be noted that many alternative or additional functional relationships, physical connections or logical connections may be present in a practical device.

As used herein, the term "and/or" includes any and all combinations of one or more of the associated listed items. Expressions such as "at least one of," when preceding a list of elements, modify the entire list of elements and do not modify the individual elements of the list. The word "exemplary" is used herein to mean "serving as an example or illustration." Any aspect or design described herein as "exemplary" is not necessarily to be construed as preferred or advantageous over other aspects or designs.

Hereinafter, the present disclosure will be described in detail with reference to the accompanying drawings.

FIG. 1 is a diagram illustrating an image display apparatus 100 for displaying a 360-degree image according to an exemplary embodiment.

As shown in FIG. 1, the image display apparatus 100 may be a television but is not limited thereto and may be embodied as an electronic apparatus having a display. For example, the image display apparatus 100 may be embodied as any electronic device, such as a cellular phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, a wearable device, or the like. Furthermore, the image display apparatus 100 may be of a fixed (e.g., stationary) type or a portable type, and may be a digital broadcast receiver capable of receiving a digital broadcast.

The image display apparatus 100 may be embodied as a curved display apparatus having a curved screen or a flexible display apparatus having an adjustable curvature, as well as a flat display apparatus. Resolutions of outputs of the image display apparatus 100 may include, for example, high definition (HD), full HD, ultra HD, and a resolution higher than the ultra HD.

The image display apparatus 100 may be controlled by a control device 101. The control device 101 may be embodied as devices having various shapes and capable of controlling the image display apparatus 100 (e.g., a remote controller or a cellular phone). Alternatively, when a display of the image display apparatus 100 is a touch screen, the control device 101 may be a user's finger, an input pen (e.g., a stylus), or the like.

Furthermore, the control device 101 may control the image display apparatus 100 through short-range communication, including infrared communication or Bluetooth.

The control device 101 may control functions of the image display apparatus 100 by using keys (e.g., buttons), a touchpad, a microphone through which a user's voice may be received, and/or a sensor capable of sensing a motion of the control device 101 and installed in the control device 101.

The control device 101 may include a power on/off button for turning on or off the image display apparatus 100. Furthermore, the control device 101 may change channels of the image display apparatus 100, adjust volume of the image display apparatus 100, select from among a terrestrial broadcast, a cable broadcast, and a satellite broadcast, or perform environment settings according to a user's input.

Alternatively, the control device 101 may be a pointing device. For example, the control device 101 may serve as a pointing device when a specific key input is received.

In various exemplary embodiments of the present disclosure, the term "user" means a person who controls functions or operations of the image display apparatus 100 by using the control device 101 and should be understood to include a viewer, a manager, an installation engineer, etc.

According to an exemplary embodiment, the image display apparatus 100 is capable of displaying a 360-degree image.

The 360-degree image may be an image with a 360-degree viewing angle. The 360-degree image may be a panoramic image. For example, the 360-degree image may be generated based on a plurality of images captured in a 360-degree direction by using at least one camera. In this case, the plurality of captured images may be mapped to a sphere, and points of contact of the mapped images may be connected (e.g., stitched) to one another to form a 360-degree image of a sphere shape. The 360-degree image of the sphere shape may be converted into a 360-degree image 50 of a planar shape to be transmitted to or stored in another device, as illustrated in FIG. 1.

In an exemplary embodiment, the image display apparatus 100 may perform graphics processing on the 360-degree image 50 of the planar shape to convert the 360-degree image 50 into a 360-degree image 70 having a sphere shape. For example, the image display apparatus 100 may generate the 360-degree image 70 having the sphere shape by mapping a 360-degree image of a planar shape to a sphere. Then, the image display apparatus 100 may select an area 80 corresponding to a specific viewpoint of the 360-degree image 70 of the sphere shape, and display an image corresponding to the selected area 80.

According to an exemplary embodiment, the image display apparatus 100 may display an image corresponding to a selected viewpoint of a 360-degree image. Furthermore, the image display apparatus 100 may display an image corresponding to a viewpoint changed according to a viewpoint change input. For example, if the 360-degree image is a video having a storyline such as a movie or a television show, a user may miss an important event occurring in the movie or the television when the user arbitrarily selects a viewpoint. Thus, a method of providing a recommended viewpoint may be necessary to help the user select an appropriate viewpoint when viewing the 360-degree image.

Figure 2:
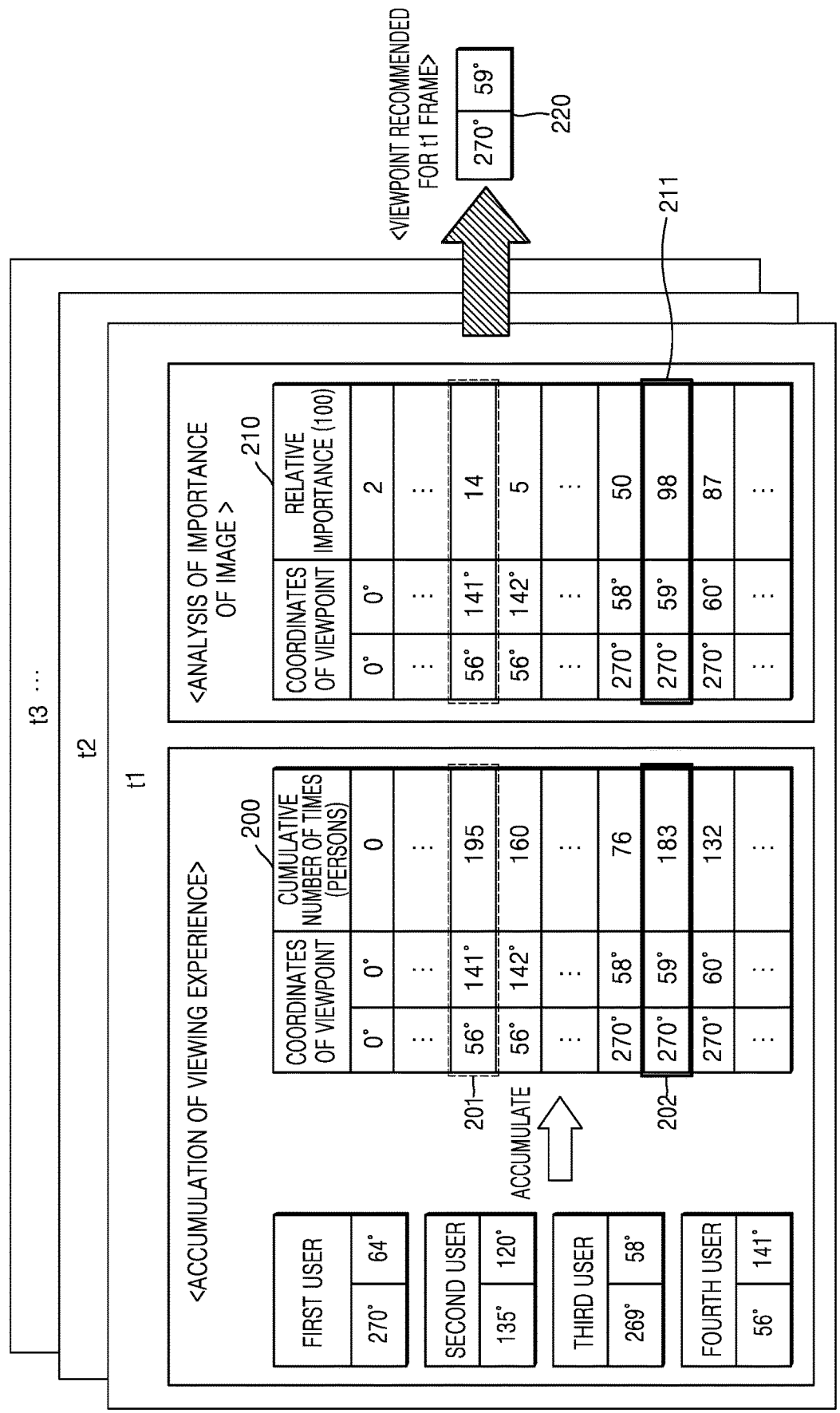
FIG. 2 is a diagram illustrating an image display method according to an exemplary embodiment.

FIG. 2 is a diagram illustrating an image display method according to an exemplary embodiment.

According to an exemplary embodiment, the image display apparatus 100 may determine viewpoints of respective frames of a 360-degree image, based on at least one of viewing-history data of the 360-degree image and a result of analyzing characteristics of the 360-degree image.

The viewing-history data of the 360-degree image may be understood as data regarding viewpoints selected by at least one user when the 360-degree image is reproduced. Even if the same 360-degree image is viewed, a viewpoint to be selected may vary according to a user. For example, as shown in FIG. 2, at a t1 frame of a 360-degree video, a first user may select a viewpoint corresponding to (270°, 64°), a second user may select a viewpoint corresponding to (135°, 120°), a third user may select a viewpoint corresponding to (269°, 58°), and a fourth user may select a viewpoint corresponding to (56°, 141°).

For example, a viewpoint may be represented using x and y coordinates with respect to a 360-degree image of a planar shape or may be represented using coordinates of horizontal and vertical angles (e.g., longitude and latitude) with respect to a 360-degree image of a planar shape or a 360-degree image of a sphere shape. For example, the horizontal angle (e.g., longitude) may be in the range of 0 to 360 degrees, and the vertical angle (e.g., latitude) may be in the range of 0 to 180 degrees. Alternatively, according to one embodiment, the vertical angle may be in the range of −90 to 90 degrees. A method of representing a viewpoint may vary according to an embodiment and is not limited to the above description.

As the number of users who view the same 360-degree image increases, information regarding viewpoints selected by the users may be accumulated. For example, as shown in FIG. 2, according to data 200 representing the frequency of a selected viewpoint, a viewpoint 201 corresponding to (56°, 141°) is a viewpoint selected at the t1 frame a largest number of times (a cumulative number of times 195). A viewpoint 202 corresponding to (270°, 59°) is a viewpoint selected at the t1 frame a second largest number of times (a cumulative number of times 183). Thus, the image display apparatus 100 may select the viewpoint 201 corresponding to (56°, 141°) or the viewpoint 202 corresponding to (270°, 59°) as a viewpoint to be recommended for the t1 frame based on the frequencies of selection of viewpoints.

According to an exemplary embodiment, the image display apparatus 100 may represent, in the form of a recommendation grade (e.g., ranking, rating), a degree of recommendation of each viewpoint based on a result of analyzing characteristics of frames of a 360-degree image. For example, the image display apparatus 100 may set a recommendation grade of a viewpoint corresponding to an object or a face detected in a frame to be relatively high. Alternatively, the image display apparatus 100 may set a recommendation grade of a viewpoint corresponding to an object which is moving quickly or has a large change in size, detected in a frame, to be relatively high.

For example, according to data 210 representing a degree of recommendation of each viewpoint in FIG. 2, a recommendation grade of a viewpoint 211 corresponding to (270°, 59°) may be set to be high (i.e., 98 out of 100), as the result of analyzing the characteristics of the 360-degree image. The viewpoint 211 corresponding to (270°, 59°) may be a viewpoint at which an event occurs at the t1 frame.

According to an exemplary embodiment, the image display apparatus 100 may determine a viewpoint to be recommended for each of the frames of the 360-degree image, based on the viewing-history data of the 360-degree image and the result of analyzing the characteristics of the 360-degree image. As shown in FIG. 2, the image display apparatus 100 may determine a viewpoint corresponding to (270°, 59°) to be a viewpoint 220 to be recommended for the t1 frame. The viewpoint corresponding to (270°, 59°) is selected with respect to the t1 frame by a second largest number of users and is assigned a highest recommendation grade according to the data 210 representing the degree of recommendation of each viewpoint. Thus, the image display apparatus 100 may determine the viewpoint corresponding to (270°, 59°) to be the viewpoint 220 to be recommended for the t1 frame by taking into account viewpoints selected by other users and the characteristics of the 360-degree image.

Figure 3:
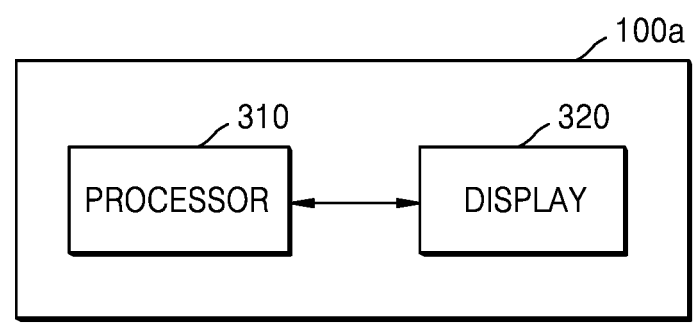
FIG. 3 is a block diagram of an image display apparatus according to an exemplary embodiment.

FIG. 3 is a block diagram of an image display apparatus 100a according to an exemplary embodiment.

The image display apparatus 100a of FIG. 3 may be an exemplary embodiment of the image display apparatus 100 of FIG. 1. As shown in FIG. 3, the image display apparatus 100a may include a processor 310 and a display 320. However, the image display apparatus 100a is not limited thereto and may further include other elements.

The above elements will be described below.

The processor 310 may include at least one memory and various combinations of processors. For example, the at least one memory may generate or delete a program module according to an operation of the processor 310, and the processor 310 may process operations of the program module.

According to an exemplary embodiment, the processor 310 generates a viewpoint guide map, based on at least one of viewing-history data of a 360-degree image and a result of analyzing characteristics of the 360-degree image.

The viewpoint guide map may be understood as data regarding a viewpoint recommended for at least one frame of the 360-degree image. For example, the viewpoint guide map may represent a degree of recommendation of a viewpoint for each of the frames of the 360-degree image.

According to an exemplary embodiment, the processor 310 may generate a first guide map based on viewing-history data of the 360-degree image. The viewing-history data of the 360-degree image may be understood as data regarding a viewpoint selected by a viewing-history provider selected according to a predetermined criterion among viewers who view the same 360-degree image. For example, the processor 310 may obtain as the viewing-history data of the 360-degree image a list of recommended viewpoints generated when the viewing-history provider views the 360-degree image.

The processor 310 may select at least one viewing-history provider, based on at least one of a first characteristic of the 360-degree image and information regarding a user. For example, the first characteristic of the 360-degree image may be a genre of the 360-degree image. Examples of the genre of the 360-degree image may include a movie, a drama (e.g., a TV show), sports content, etc. but are not limited thereto. For example, when the 360-degree image is movie content, the processor 310 may select a film producer or a film critic as a viewing-history provider. When the 360-degree image is sports content, the processor 310 may select a sports player or a sports commentator as a viewing-history provider. For example, when the 360-degree image is a personal video shared on a social media service, the processor 310 may select a user who shares the personal video as a viewing-history provider. The information regarding the user may be, for example, the user's age, sex, residence, occupation, etc. but is not limited thereto. For example, when the user is a man in twenties, the processor 310 may select a man in twenties as a viewing-history provider.

In one embodiment, the processor 310 may generate a second guide map based on the result of analyzing characteristics of the 360-degree image.

The processor 310 may analyze the 360-degree image to obtain information regarding pixels of each of the frames of the 360-degree image and information regarding a motion of an object detected in the 360-degree image. For example, the information regarding the pixels may include at least one from among the colors, brightness, gradients, and directions of the gradients of pixels of each of the frames of the 360-degree image. The information regarding the motion of the object detected in the 360-degree image may include, for example, information regarding displacement of the object, information regarding change in the size of the object, and/or information regarding time when the object appears in the 360-degree image.

According to an exemplary embodiment, the processor 310 may determine a highlight area based on at least one of the information regarding the pixels and the information regarding the motion of the object detected in the 360-degree image. The processor 310 may generate the second guide map by setting a recommendation grade of a viewpoint corresponding to the highlight area to be higher than viewpoints of other areas.

According to an exemplary embodiment, the processor 310 may generate the viewpoint guide map by respectively applying weights to the first guide map and the second guide map. For example, the processor 310 may determine the weights based on at least one among a distribution of recommendation grades in the first guide map, a second characteristic of the 360-degree image, and a number of times that other users view the 360-degree image. For example, the second characteristic of the 360-degree image may include, but is not limited to, whether the 360-degree image is plot-driven content, such as a drama (e.g., TV show) or a movie, or whether the 360-degree image is event-driven content (e.g., a surveillance-camera footage, a flight recorder footage, or dashboard camera footage).

According to an exemplary embodiment, the processor 310 may generate a list of recommended viewpoints of the 360-degree image, based on the viewpoint guide map. For example, the list of recommended viewpoints may include a viewpoint recommended for each of the frames of the 360-degree image. The list of recommended viewpoints may include viewpoints recommended for frames corresponding to changed viewpoints or viewpoints recommended for frames sampled at predetermined intervals of time. For example, the image display apparatus 100 may store viewpoints recommended for frames sampled at intervals of three frames in the list of recommended viewpoints. The image display apparatus 100 may reduce the size of the list of recommended viewpoints by storing a viewpoint recommended for a frame for which viewpoints are changed in the list of recommended viewpoints or storing viewpoints for frames sampled at predetermined intervals of time in the list of recommended viewpoints.

According to an exemplary embodiment, when a first frame is switched to a second frame, the processor 310 may determine as a viewpoint of the second frame a point of a highest recommendation grade on the second frame in a viewpoint guide map corresponding to the second frame. In one embodiment, the processor 310 may determine a viewpoint of the second frame by taking into account the distance between a point representing a viewpoint of the first frame and the point of the highest recommendation grade on the second frame in the viewpoint guide map corresponding to the second frame.

According to an exemplary embodiment, when the 360-degree image is reproduced again according to a user's input, the processor 310 may generate the viewpoint guide map on the basis of viewing-history data generated when the user viewed the 360-degree image and a second guide map generated based on a result of analyzing characteristics of the 360-degree image. For example, the viewing-history data generated when the user viewed the 360-degree image may include information regarding viewpoints selected when the user viewed the 360-degree image. The processor 310 may determine a viewpoint to be recommended in consideration of the user's preference by determining the viewpoint to be recommended based on the viewing-history data generated when the user viewed the 360-degree image.

However, when a viewpoint to be recommended is determined only based on the viewing-history data, the user may miss a viewpoint at which an important event occurs in the 360-degree image. Thus, the processor 310 may generate the viewpoint guide map based on the viewing-history data generated when the user viewed the 360-degree image and the second guide map generated based on the result of analyzing the characteristics of the 360-degree image. Thus, the processor 310 may determine a viewpoint in consideration of the user's preference and so that the user may view an important event occurring in the 360-degree image without missing the important event.

In one embodiment, the display 320 may display an image corresponding to a selected viewpoint. For example, the display 320 may display an image corresponding to a viewpoint according to the list of recommended viewpoints as frames of the 360-degree image are changed.

According to an exemplary embodiment, the display 320 may display a user interface for selecting a reproduction mode. For example, the display 320 display a user interface for selecting one of a plurality of reproduction modes for automatically reproducing (e.g., displaying) a 360-degree image.

When the display 320 is embodied as a touch screen, the display 320 may serve as an input device, as well as an output device. For example, the display 320 may include at least one among a liquid crystal display (LCD), a thin-film transistor-LCD, an organic light-emitting diode (OLED), a flexible display, a three-dimensional (3D) display, and an electrophoretic display. The image display apparatus 100a may include two or more displays 320 according to the shape of the image display apparatus 100.

Figure 4:
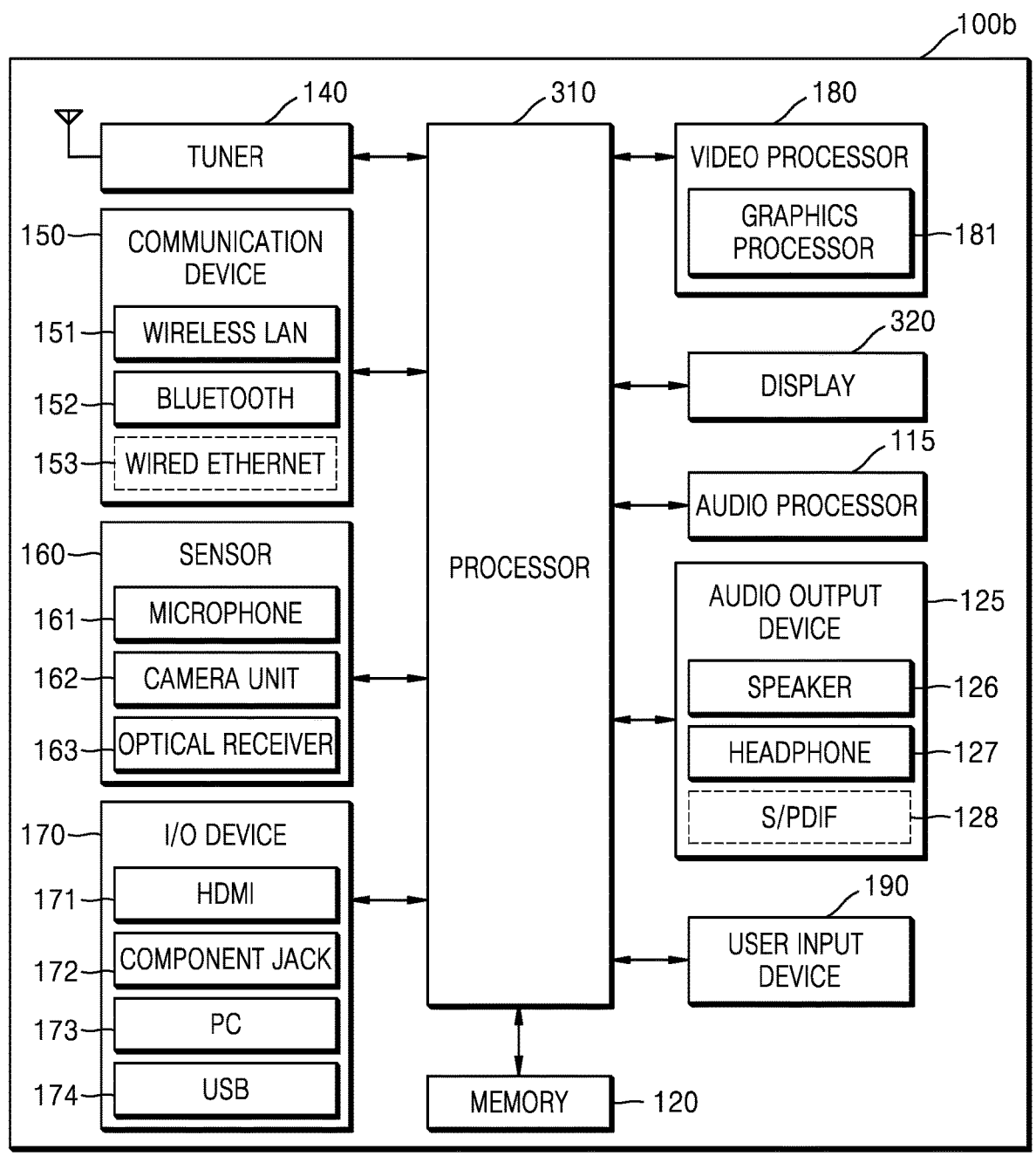
FIG. 4 is a block diagram of an image display apparatus according to an exemplary embodiment.

FIG. 4 is a block diagram of an image display apparatus 100b according to an exemplary embodiment.

As shown in FIG. 4, the image display apparatus 100b may include a processor 310 and a display 320, and may further include a memory 120, a user input device 190, a tuner 140, a communication device 150, a sensor 160, an input/output (I/O) unit 170, a video processor 180, an audio processor 115, and an audio output device 125.

In FIG. 4, descriptions regarding the processor 310 and the display 320 that are the same as those described above with reference to FIG. 3 are omitted.

The user input unit 190 may be understood as a means for inputting data needed for a user to control the image display apparatus 100b. For example, the user input unit 190 may include a keypad, a dome switch, a touch pad, a jog wheel, a jog switch, etc. but is not limited thereto.

The user input device 190 may be an element of the control device 101 described above or an element of the image display apparatus 100b.

According to an exemplary embodiment, the user input device 190 may receive an input for moving a viewpoint. For example, when the user input device 190 is embodied as a keypad or a dome switch, the input for moving the viewpoint may be an input for clicking or pressing a key corresponding to a specific direction. When the user input unit 190 is embodied as a touch pad, the input for moving the viewpoint may be an input for touching the key corresponding to the specific direction. However, the present disclosure is not limited thereto.

In relation to the input for moving the viewpoint, a degree of change in the viewpoint may vary according to a method of clicking or touching a key. For example, when the key is pressed or touched for a predetermined time or more, the viewpoint may be continuously moved. When the key is clicked or touched for a short time, the viewpoint may be moved in units (e.g., increments) of predetermined angles or distances. For example, whenever a user clicks a key corresponding to a right direction, the viewpoint may be moved by 30 degrees in the right direction but is not limited thereto.

According to an exemplary embodiment, the user input device 190 may receive an input for selecting a reproduction mode. For example, the input for selecting the reproduction mode may be an input for selecting a reproduction mode among a plurality of reproduction modes classified according to a criterion for determining a viewpoint.

The display 320 may display video included in a broadcast signal received via the tuner 140 on a screen thereof under control of the processor 310. Furthermore, the display 320 may display content (e.g., a video), which is input via the communication device 150 or the I/O device 170. The display 320 may output an image stored in the memory 120 under control of the processor 310.

The audio processor 115 processes audio data. The audio processor 115 may perform various types of audio processing, such as decoding, amplification, or noise filtering, on the audio data. The audio output device 125 may output audio included in a broadcast signal received via the tuner 140, audio input via the communication device 150 or the I/O device 170, and audio stored in the memory 120, under control of the processor 310. The audio output device 125 may include a speaker 126, a headphone output terminal 127, and/or a Sony/Philips Digital Interface (S/PDIF) output terminal 128.

The tuner 140 may tune and select only a frequency of a channel to be received by the image display apparatus 100b among many radio wave components by performing amplification, mixing, resonance, or the like on a broadcast signal received by wire or wirelessly. The broadcast signal includes audio, video, and additional information such as an electronic program guide (EPG).

Decoding (e.g., audio-decoding, video-decoding, or additional-information decoding) is performed to divide the broadcast signal received via the tuner 140 into audio, video and/or additional information. The audio, the video and/or the additional information may be stored in the memory 120 under control of the processor 310.

In the image display apparatus 100b, one or more tuners 140 may be provided. The tuner 140 may be integrated with the image display apparatus 100b in an all-in-one structure (e.g., within a single housing) or may be embodied as a separate device having a tuner unit electrically connected to the image display apparatus 100b (e.g., a set-top box) or an external turner unit connected to the I/O unit 170.

The communication device 150 may connect the image display apparatus 100b to an external device (e.g., an audio device or the like) under control of the processor 310. The processor 310 may transmit content to or receive content from an external device connected thereto via the communication device 150, download an application from the external device, or perform web browsing.

The communication device 150 may include a wireless local area network (LAN) communication device 151, a Bluetooth communication device 152, and/or a wired Ethernet communication device 153 according to the performance and structure of the image display apparatus 100b. Alternatively, the communication unit 150 may include a combination of the wireless LAN communication device 151, the Bluetooth communication device 152, and the wired Ethernet communication device 153. The communication device 150 may receive a control signal of the control device 101 under control of the processor 310. The control signal may be of a Bluetooth type, a radio-frequency (RF) signal type, or a Wi-Fi type.

The communication device 150 may further include another short-range communication (e.g., near-field communication (NFC) (not shown) or Bluetooth low energy (BLE) (not shown), as well as Bluetooth) communication device.

According to an exemplary embodiment, the communication device 150 may receive viewing-history data of a 360-degree image from a server. Furthermore, in order to reproduce the 360-degree image based on a list of recommended viewpoints provided from a manufacturer, the communication device 150 may receive the list of recommended viewpoints from the server. Alternatively, the communication device 150 may receive a list of recommended viewpoints of another user, shared on the Internet from the server.

The sensor 160 may sense a user's voice, image, or interaction, and may include a microphone 161, a camera unit 162, and/or an optical receiver 163.

The microphone 161 receives a user's uttered voice. The microphone 161 may convert received the user's voice into an electrical signal and output the electrical signal to the processor 310.

The camera device 162 may receive an image (e.g., consecutive frames) corresponding to a user's motion, including a gesture, within a range (e.g., angle of view) of camera recognition.

The optical receiver 163 receives an optical signal (including a control signal) from an external control device. The optical receiver 163 may receive an optical signal corresponding to a user input (e.g., a user's touch, pressing, touch gesture, voice, or motion) from the external control device. A control signal may be extracted from the received optical signal under control of the processor 310.

According to an exemplary embodiment, the optical receiver 163 may receive an optical signal corresponding to a user input for changing viewpoints from the control device 101. Furthermore, the optical receiver 163 may receive an optical signal corresponding to a user input for selecting a reproduction mode from the control device 101.

The I/O device 170 receives video (e.g., a moving picture), audio (e.g., voice or sound), additional information (e.g., an EPG), etc. from the outside of the image display apparatus 100b, under control of the processor 310. The I/O device 170 may include a high-definition multimedia interface (HDMI) port 171, a component jack 172, a PC port 173, and/or a universal serial bus (USB) port 174. Alternatively, the I/O device 170 may include a combination of the HDMI port 171, the component jack 172, the PC port 173, and/or the USB port 174.

According to an aspect of an exemplary embodiment, the memory 120 may store a program for processing and controlling the processor 310, and store data input to the image display apparatus 100b or data to be output from the image display apparatus 100b.

The memory 120 may include a flash memory type storage medium, a hard disk type storage medium, a multimedia card micro type storage medium, a card type memory (e.g., an Secure Digital (SD) or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

According to an exemplary embodiment, the memory 120 may generate a viewpoint guide map based on at least one of viewing-history data of a 360-degree image and a result of analyzing characteristics of the 360-degree image, generate a list of recommended viewpoints of the 360-degree image based on the viewpoint guide map, and include a module including at least one instruction for displaying an image included in the 360-degree image corresponding to a viewpoint according to the list of recommended viewpoints.

The processor 310 controls overall operations of the image display apparatus 100b and the flow of a signal between internal elements of the image display apparatus 100b, and process data. When a user input is received or a stored predetermined condition is satisfied, the processor 310 may run an operating system (OS) and various applications stored in the memory 120.

According to an exemplary embodiment, the processor 310 may execute at least one instruction stored in the memory 120, generate a viewpoint guide map based on at least one of the viewing-history data of the 360-degree image and the result of analyzing the characteristics of the 360-degree image, generate a list of recommended viewpoints of the 360-degree image based on the viewpoint guide map, and display an image corresponding to a viewpoint according to the list of recommended viewpoints of the 360-degree image.

The block diagrams of the image display apparatuses 100a and 100b of FIGS. 3 and 4 are merely examples. Some elements of the block diagrams may be integrated or omitted or additional elements may be added according to the specifications of the image display apparatuses 100a and 100b. For example, two or more elements may be integrated into one element or one element may be divided into two or more elements if necessary. Furthermore, the functions of these elements are examples cited to describe embodiments and thus the scope of the present disclosure is not limited by particular operations or devices.

Figure 5:
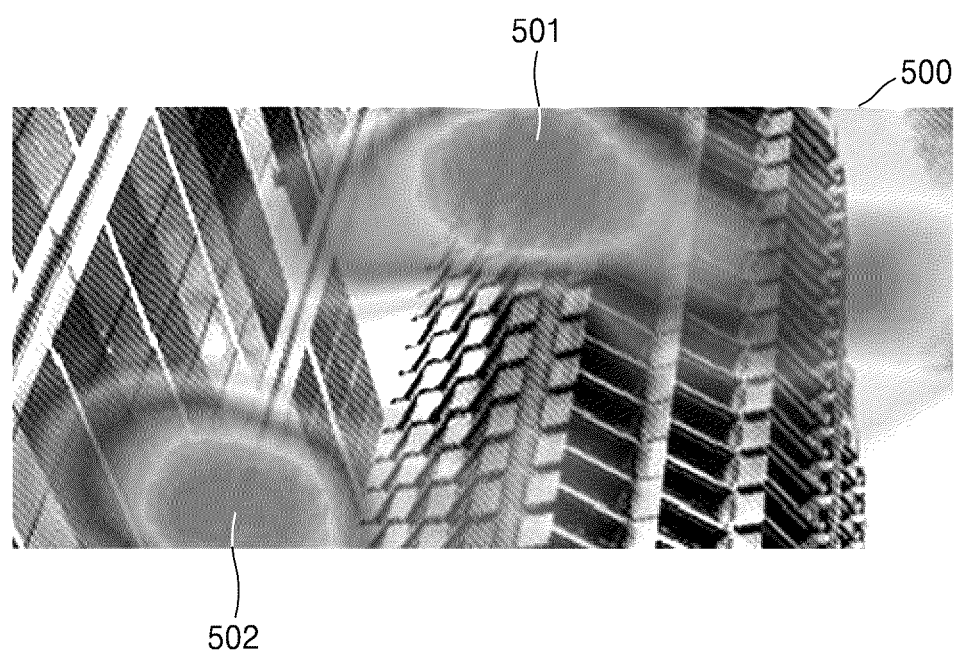
FIG. 5 is a diagram illustrating a viewpoint guide map according to an exemplary embodiment.

FIG. 5 is a diagram illustrating a viewpoint guide map according to an exemplary embodiment.

According to an exemplary embodiment, the image display apparatus 100 may generate a viewpoint guide map based on at least one of viewing-history data of a 360-degree image and a result of analyzing characteristics of the 360-degree image.

As described above, the viewpoint guide map represents a degree of recommendation of a viewpoint to be determined according to the location of at least one among frames of the 360-degree image. For example, in the viewpoint guide map, a recommendation grade representing a degree of recommendation of each viewpoint in a frame may be represented using a color or numbers. For example, the image display apparatus 100 may represent a recommendation grade of each viewpoint by using one of numbers ranging from 0 to 100 but the range of a recommendation grade may vary according to an embodiment.

When a recommendation grade is represented using a color, the image display apparatus 100 may map a recommendation grade of each viewpoint to a predetermined color. For example, referring to FIG. 5, the image display apparatus 100 may represent points 501 and 502 representing viewpoints of high recommendation grades (e.g., viewpoints of recommendation grades ranging from 85 to 100) in a viewpoint guide map 500 by using a red color. Furthermore, the image display apparatus 100 may represent a point representing a viewpoint of a relatively low recommendation grade (for example, a viewpoint of a recommendation grade of 40 or less) by using a blue color. However, the present disclosure is not limited thereto.

According to an exemplary embodiment, as illustrated in FIG. 5, in the viewpoint guide map, information (e.g., colors or numbers) representing a recommendation grade of each viewpoint may be displayed to overlap with a 360-degree image having a planar shape or a sphere shape but is not limited thereto.

Figure 6:
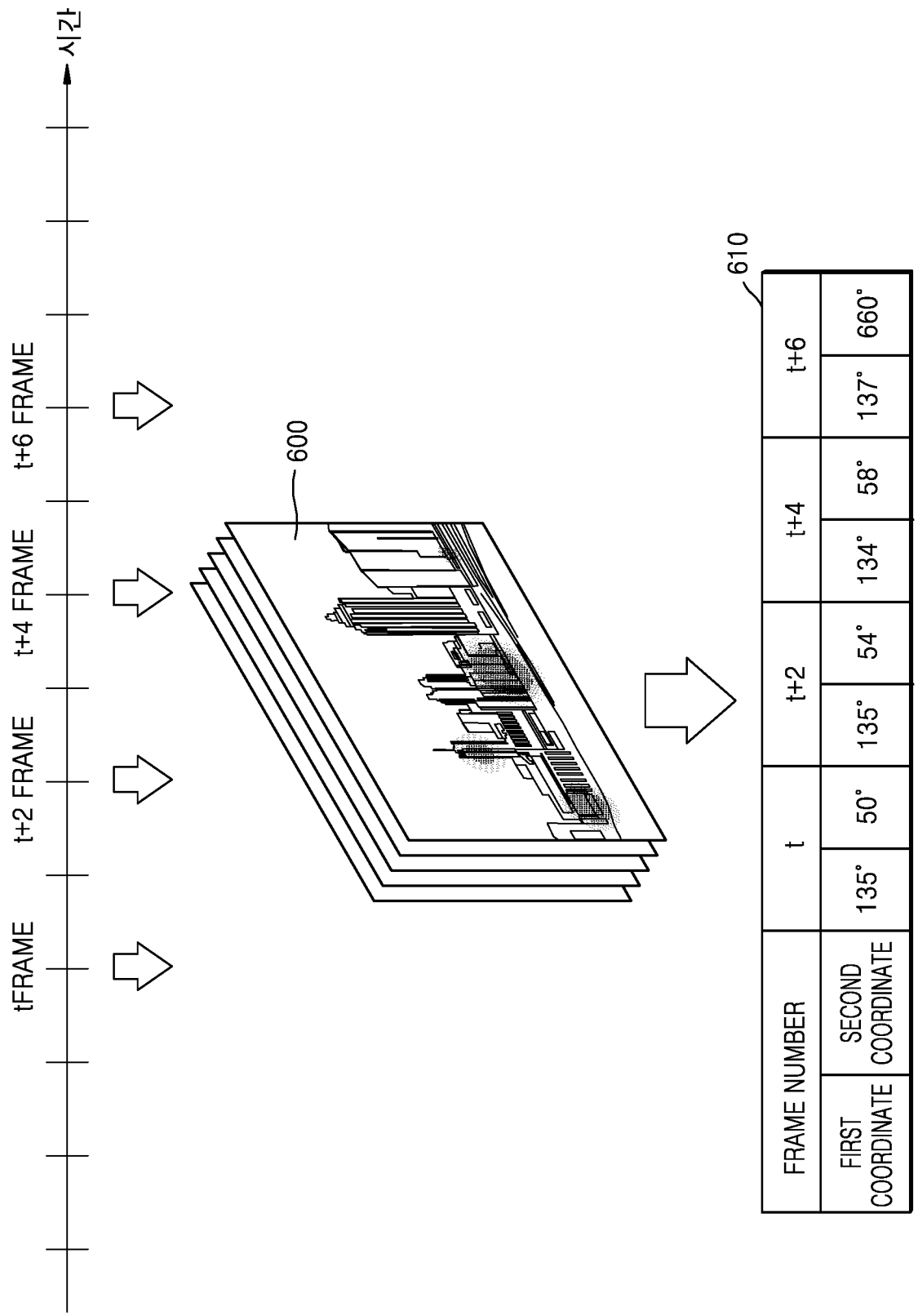
FIG. 6 is a diagram illustrating a method of generating a viewpoint guide map, according to an exemplary embodiment.

FIG. 6 is a diagram illustrating a method of generating a viewpoint guide map, performed by the image display apparatus 100, according to an exemplary embodiment.

According to an exemplary embodiment, the image display apparatus 100 may generate a viewpoint guide map corresponding to each frame of a 360-degree image. Alternatively, in one embodiment, the image display apparatus 100 may generate a viewpoint guide map corresponding to frames sampled at intervals of a predetermined number of frames.

For example, the image display apparatus 100 may generate a viewpoint guide map corresponding to frames sampled at intervals of two frames. In FIG. 6, the image display apparatus 100 may generate a viewpoint guide map 600 corresponding to a t frame, a (t+2) frame, a (t+4) frame, and a (t+6) frame. Furthermore, the image display apparatus 100 may generate a list of recommended viewpoints based on the viewpoint guide map 600. For example, the image display apparatus 100 may determine viewpoints to be recommended for the t frame, the (t+2) frame, the (t+4) frame, and the (t+6) frame based on the viewpoint guide map 600. In addition, the image display apparatus 100 may generate a list of recommended viewpoints 610 including the viewpoints to be recommended for the t frame, the (t+2) frame, the (t+4) frame, and the (t+6) frame.

When the 360-degree image is reproduced, the frames of the 360-degree image pass very quickly and thus a degree of change in the viewpoints when frames are changed is not large. Thus, the image display apparatus 100 may generate a viewpoint guide map corresponding to frames sampled at intervals of a predetermined number of frames, thereby reducing the amount of calculation for generation of the viewpoint guide map and the size of the viewpoint guide map.

Figure 7:
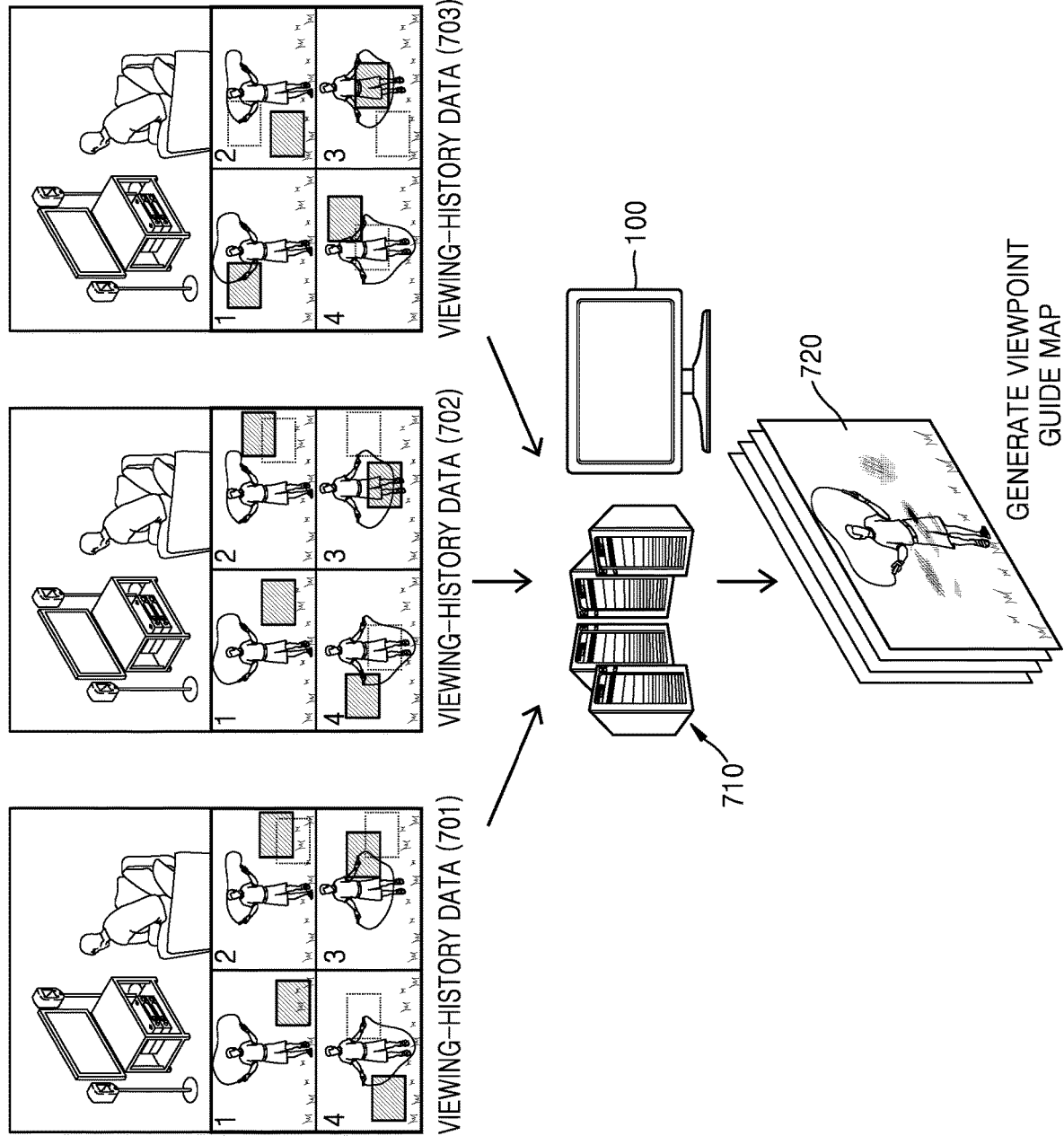
FIG. 7 is a diagram illustrating a method of generating a first guide map, according to an exemplary embodiment.

FIG. 7 is a diagram illustrating a method of generating a first guide map, according to an exemplary embodiment.

According to an exemplary embodiment, an image display apparatus 100 may generate a viewpoint guide map for providing information regarding viewpoints recommended for a 360-degree image based on viewing-history data of the 360-degree image.

The viewing-history data of the 360-degree image may be understood as data regarding a viewpoint selected by at least one user when the 360-degree image is reproduced. For example, the viewing-history data of the 360-degree image may be data regarding a viewpoint selected by a viewing-history provider when the 360-degree image is reproduced.

According to an exemplary embodiment, the image display apparatus 100 may select the viewing-history provider, based on at least one of a first characteristic of the 360-degree image and information regarding a user.

The first characteristic of the 360-degree image may be understood as, for example, a genre or category (e.g., a sports image, a movie, a drama, or the like) of the 360-degree image. For example, when the 360-degree image is movie content, a film producer or a film critic may more appropriately select a viewpoint for the movie content than other users. Thus, the image display apparatus 100 may select the film producer or the film critic as a viewing-history provider.

As another example, when the 360-degree image is a sports image, a sports player or a sports commentator may appropriately select a viewpoint for the sports image. Thus the image display apparatus 100 may select the sports player or the sports commentator as a viewing-history provider when the 360-degree image is related to a sports image. However, the first characteristic of the 360-degree image to be used to select the viewing-history provider may vary according to various exemplary embodiments and is thus not limited to the above description.

According to an exemplary embodiment, the image display apparatus 100 may select the viewing-history provider, based on information regarding a user. For example, a favored viewpoint in the 360-degree image may vary according to the user's age, sex, residence, occupation or the like. Thus, the image display apparatus 100 may select, as viewing-history providers, users whose information is the same as at least one among the information regarding the user, including the user's age, sex, residence, occupation or the like.

In FIG. 7, viewing-history data 701, 702, and 703 including information regarding viewpoints selected by at least one viewing-history provider may be generated. For example, viewing-history data may include a list of recommended viewpoints but is not limited thereto.

For example, when the 360-degree image is movie content and a user is a woman in twenties, the image display apparatus 100 may select a film producer, a film critic, and a woman in twenties as viewing-history providers. The film producer and the film critic are viewing-history providers selected based on the first characteristic that the 360-degree image is the movie content, and the woman in twenties is a viewing-history provider selected based on information regarding the user.

The generated viewing-history data 701, 702, and 703 may be stored in a server 710 or a memory of the image display apparatus 100.

According to an exemplary embodiment, the image display apparatus 100 may generate a first guide map $M_1$ 720 based on the viewing-history data 701, 702, and 703 stored in the memory or the server 710.

For example, when a film producer, a film critic, and a woman in twenties are selected as viewing-history providers, the image display apparatus 100 may generate a viewpoint guide map $M_m$ based on viewing-history data of the film producer and the film critic and generate a viewpoint guide map $M_c$ based on viewing-history data of the woman in twenties. Furthermore, the image display apparatus 100 may generate the first guide map $M_1$ 720 from a combination of the two viewpoint guide maps $M_m$ and $M_c$. For example, the image display apparatus 100 may generate the first guide map $M_1$ 720 according to Equation 1 below.

$$M_1 = w_m \cdot M_m + w_c \cdot M_c, w_m + w_c = 1 \quad \text{[Equation 1]}$$

For example, the image display apparatus 100 may generate the first guide map $M_1$ 720 by applying a weight $w_m$ to the viewpoint guide map $M_m$ generated based on the viewing-history data of the film producer and the film critic and a weight $w_c$ to the viewpoint guide map $M_c$ generated based on the viewing-history data of the woman in twenties.

The weights $w_m$ and $w_c$ may vary according to the number of pieces of the viewing-history data of the film producer and the film critic and the number of pieces of the viewing-history data of the woman in twenties. As the total number of the viewing-history data 701, 702, and 703 is increased, the reliability thereof may be increased. For example, a viewpoint selected by a hundred people may be more appropriate than a viewpoint selected by ten people. Thus, the image display apparatus 100 may differently determine weights based on the total number of pieces of viewing-history data.

For example, when the number of pieces of the viewing-history data of the film producer and the film critic is twice the number of pieces of the viewing-history data of the woman in twenties, the image display apparatus 100 may set the weight $w_m$ to ⅔ and the weight $w_c$ to ⅓. As another example, when a user will view the 360-degree image from a viewpoint recommended on the basis of the viewing-history data of the film producer and the film critic, the image display apparatus 100 may set the weight $w_m$ to 1 and the weight $w_c$ to 0. Alternatively, when the total number of the pieces of the viewing-history data of the film producer and the film critic is equal to or less than a threshold value, the weight $w_m$ may be set to be small. However, a method of combining the viewpoint guide maps $M_m$ and $M_c$, and the weights $w_m$ and $w_c$ may vary according to various exemplary embodiments and are thus not limited to the above description.

Figure 8A:
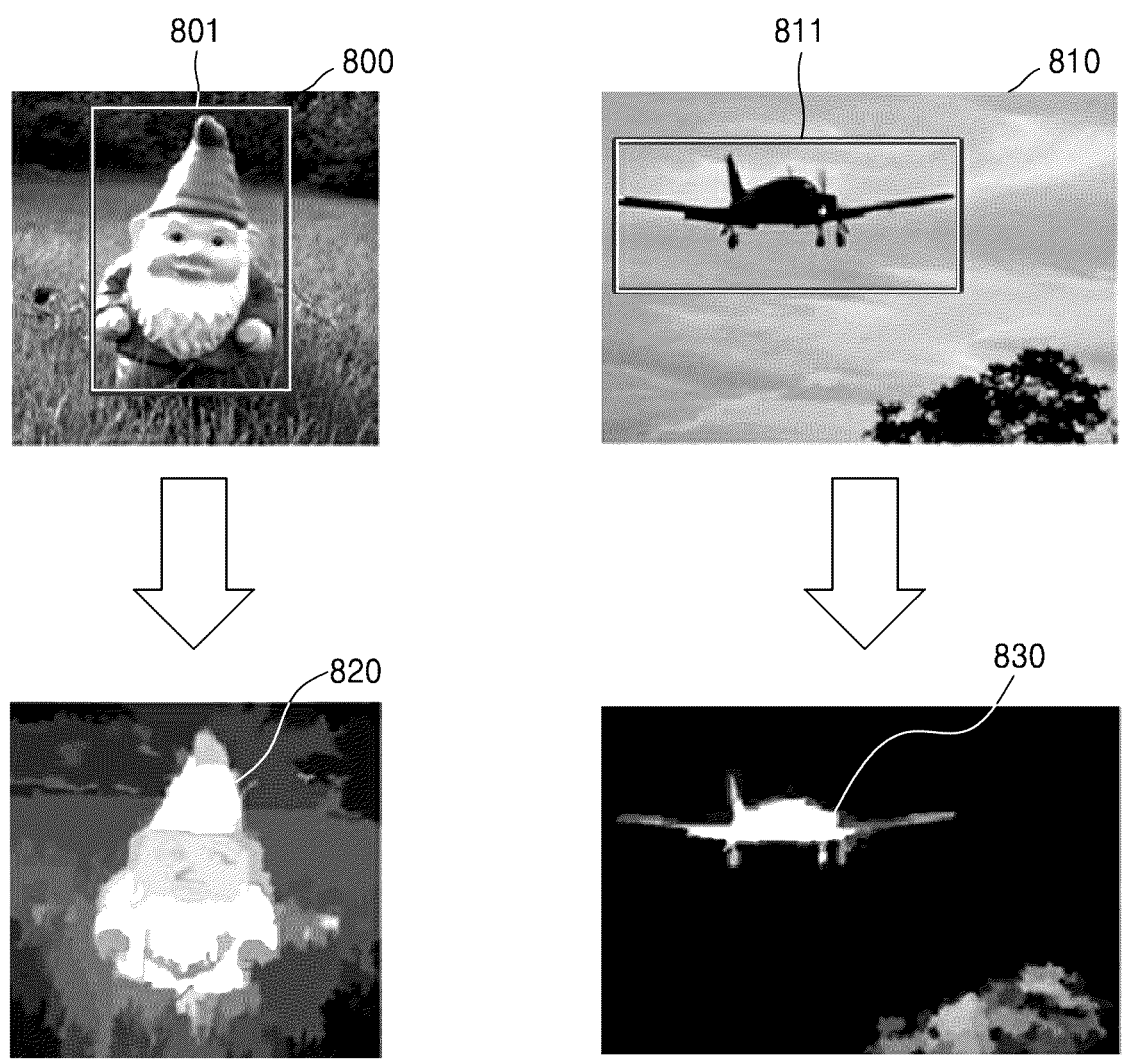
FIGS. 8A and 8B are diagrams illustrating methods of determining a highlight area, according to an exemplary embodiment.
Figure 8B:
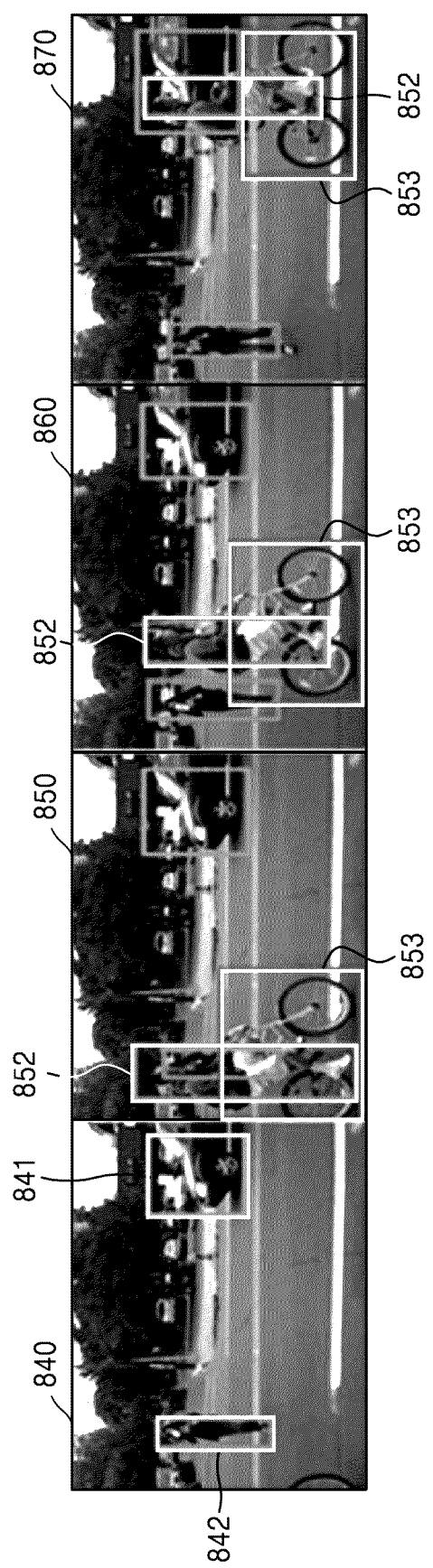

FIGS. 8A and 8B are diagrams illustrating methods of determining a highlight area, according to an exemplary embodiment.

a hundred embodiment, the image display apparatus 100 may determine a highlight area, based on information regarding pixels of each of frames of a 360-degree image and/or information regarding motions of objects detected in the 360-degree image.

The highlight area may be understood as an area determined to be important or noteworthy in each of the frames of the 360-degree image. For example, when the 360-degree image is movie content, the highlight area may be an area corresponding to a viewpoint at which an event related to a character included in the 360-degree image occurs.

The image display apparatus 100 may determine the highlight area by analyzing the 360-degree image, and set a recommendation grade of a viewpoint corresponding to the highlight area in a viewpoint guide map to be higher than those of other viewpoints.

According to an exemplary embodiment, the image display apparatus 100 may analyze at least one among the colors, brightness, and gradients of the pixels of each of the frames of the 360-degree image and directionalities of the gradients. Then the image display apparatus 100 may determine a highlight area, based on a result of the analyzation. For example, when at least one among the color, brightness, and gradient of a pixel corresponding to an area and direction of the gradient is greater by a threshold or more than those of neighboring pixels, the image display apparatus 100 may determine the area as a highlight area.

According to an exemplary embodiment, the image display apparatus 100 may determine, as a highlight area, an area corresponding to an object, a face, or the like detected in each of the frames of the 360-degree image. For example, the image display apparatus 100 may detect an area corresponding to a human face by detecting an area of each of the frame in which the number of pixels having colors corresponding to human face colors is greater than or equal to a threshold value. However, a method of detecting an object, a face, or the like may vary according to an embodiment and is not limited to the above description.

For example, in frames 800 and 810 of FIG. 8A, the image display apparatus 100 may detect objects 801 and 811 by analyzing information regarding pixels of each of the frames 800 and 810. Then the image display apparatus 100 may determine areas corresponding to the detected objects 801 and 811 as highlight areas 820 and 830.

According to an exemplary embodiment, the image display apparatus 100 may determine a highlight area based on information regarding a motion of an object detected in the 360-degree image. For example, the image display apparatus 100 may determine a highlight area based on information regarding displacement of the pixels of each of the frames of the 360-degree image, information regarding change in the size of a detected object, and/or information regarding time when the object appears in the 360-degree image.

For example, when it is determined that a detected object is moving faster than other objects, the image display apparatus 100 may determine an area corresponding to the fast moving object as a highlight area. As another example, when a result of analyzing a change in the size of a detected object reveals that the size of the object gradually increases or decreases as frames are changed, the image display apparatus 100 may determine an area corresponding to the object as a highlight area.

When an object detected in each of the frames appears in the 360-degree image for a predetermined time or more, the image display apparatus 100 may determine an area corresponding to the object as a highlight area. The image display apparatus 100 may generate a second guide map by setting a recommendation grade of the highlight area to be higher than those of other areas.

For example, referring to FIG. 8B, the image display apparatus 100 may analyze information regarding motions of objects respectively detected in first to fourth frames 840, 850, 860, and 870.

For example, while the first frame 840 of the 360-degree image is switched to the second frame 850, then to the third frame 860, and finally to the fourth frame 870, a location of an automobile 841 detected in the first frame 840 hardly changes. Similarly, a location of a human being 842 detected in the first frame 840 hardly changes while the first frame 840 is switched to the second frame 850, then to the third frame 860, and finally to the fourth frame 870. However, a degree of change in locations of a bicycle 853 and a person 852 who is riding the bicycle 853 detected in the second frame 850 is large while the second frame 850 is switched to the fourth frame 870. Thus, the image display apparatus 100 may set recommendation grades of areas corresponding to the bicycle 853 and the person 852 who is riding the bicycle 853 detected in the second frame 850 to be higher than those of areas corresponding to the automobile 841 and the person 842 detected in the first frame 840.

According to an exemplary embodiment, the image display apparatus 100 may set recommendation grades by further taking into account a genre (e.g., category) of the 360-degree image when the second guide map is generated. For example, when the 360-degree image is a movie or a drama (e.g., TV show), the image display apparatus 100 may set a recommendation grade of a viewpoint corresponding to an area of the movie or the drama in which a main character is detected to be high. When the 360-degree image is sports content in which a moving object is important, the image display apparatus 100 may set a recommendation grade of a viewpoint corresponding to an area in which the moving object is detected to be high.

According to an exemplary embodiment, the image display apparatus 100 may determine the genre of the 360-degree image, based on meta data of the 360-degree image or by receiving a user input for directly selecting a genre of the 360-degree image, but is not limited thereto.

Figure 9:
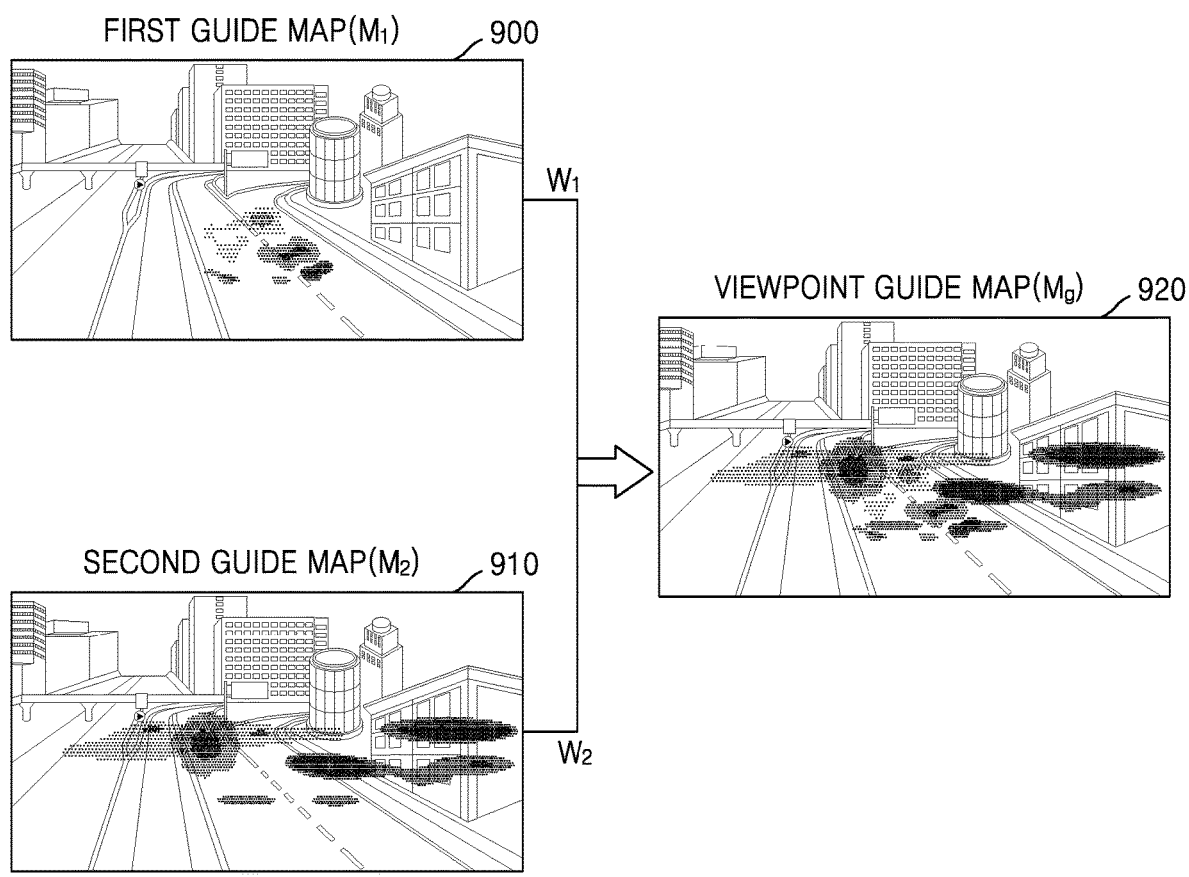
FIG. 9 is a diagram illustrating a method of combining a first guide map with a second guide map, according to an exemplary embodiment.

FIG. 9 is a diagram illustrating a method of combining a first guide map and a second guide map, according to an exemplary embodiment.

According to an exemplary embodiment, the image display apparatus 100 may generate a viewpoint guide map based on viewing-history data of a 360-degree image and a result of analyzing characteristics of the 360-degree image.

As shown in FIG. 9, the image display apparatus 100 may generate a first guide map 900 based on the viewing-history data of the 360-degree image and generate a second guide map 910 based on the result of analyzing the characteristics of the 360-degree image. For example, the image display apparatus 100 may generate the first guide map 900 according to the method described above with reference to FIG. 7, and generate the second guide map 910 according to at least one among the methods described above with reference to FIGS. 8A and 8B. The image display apparatus 100 may use the first guide map 900 or the second guide map 910 as a viewpoint guide map but a viewpoint guide map may be generated by combining the first guide map 900 and the second guide map 910.

According to an exemplary embodiment, the image display apparatus 100 may generate a viewpoint guide map 920 by respectively applying weights to the first guide map 900 and the second guide map 910. For example, the image display apparatus 100 may generate the viewpoint guide map 920 from the first guide map 900 and the second guide map 910 by using Equation 2 below.

$$M_g = w_1 \cdot M_1 + w_2 \cdot M_2, w_1 + w_2 = 1 \quad \text{[Equation 2]}$$

In Equation 2, $M_g$ may represent the viewpoint guide map 920, $M_1$ may represent the first guide map 900, $M_2$ may represent the second guide map 910, $w_1$ may represent a weight applied to the first guide map $M_1$ 900, and $w_2$ may represent a weight applied to the second guide map $M_2$ 910.

The first guide map $M_1$ 900 may include information regarding a viewpoint recommended based on viewing-history data of a viewing-history provider. The second guide map $M_2$ 910 may include information regarding a viewpoint recommended based on the characteristics of the 360-degree image. For example, the second guide map $M_2$ 910 may provide, as a viewpoint to be recommended, a viewpoint at which an event occurs in the 360-degree image or a viewpoint at which an object or a face is detected but is not limited thereto.

The weight $w_1$ applied to the first guide map $M_1$ 900 and the weight $w_2$ applied to the second guide map $M_2$ 910 may be determined based on a distribution of recommendation grades in the first guide map $M_1$ 900, a second characteristic of the 360-degree image, and/or a cumulative number of times the 360-degree image has been viewed. In this case, the second characteristic of the 360-degree image may include, but is not limited to, information regarding whether the 360-degree image is content having a storyline, such as a drama or a movie, or whether the 360-degree image is content in which an event is important, such as a surveillance camera image or a dashboard camera image.

For example, as the number of pieces of viewing-history data increases, various viewpoints may be selected by a viewing-history provider and recommendation grades may be distributed in a wide area in the first guide map $M_1$ 900. In this case, the image display apparatus 100 may determine that the reliability of the viewing-history data is low and thus set the weight $w_1$ to be applied to the first guide map $M_1$ 900 to be lower than the weight $w_2$ to be applied to the second guide map $M_2$ 910.

When the 360-degree image is content having a storyline such as a movie or a drama, it may be determined that viewing-history data of viewing-history providers is important. In this case, the image display apparatus 100 may set the weight $w_1$ to be applied to the first guide map $M_1$ 900 to be greater than the weight $w_2$ to be applied to the second guide map $M_2$ 910. However, when the 360-degree image is content in which an event is important, such as a surveillance camera image or a dashboard camera image, information regarding viewpoints recommended based on the characteristics of the 360-degree image may be more important than the viewing-history data. In this case, the image display apparatus 100 may set the weight $w_2$ to be applied to the second guide map $M_2$ 910 to be greater than the weight $w_1$ to be applied to the first guide map $M_1$ 900.

According to an exemplary embodiment, the image display apparatus 100 may determine weights to be respectively applied to a first guide map and a second guide map based on a cumulative number of times the 360-degree image has been viewed. The image display apparatus 100 may receive a user input for setting a threshold value of the cumulative number of times. For example, a user may set the threshold value of the cumulative number of times to ten thousand views. Then when the cumulative number of times the 360-degree image has been viewed is greater than or equal to the threshold value, the image display apparatus 100 may generate a viewpoint guide map based on the first guide map. When the cumulative number of times the 360-degree image has been viewed is less than the threshold value, the image display apparatus 100 may generate a viewpoint guide map based only on the second guide map.

According to an exemplary embodiment, the image display apparatus 100 may set the weights $w_1$ and $w_2$ to be respectively applied to first guide map $M_1$ 900 and the second guide map $M_2$ 910 to be the same for all frames of the 360-degree image. Alternatively, the image display apparatus 100 may set the weights $w_1$ and $w_2$ for each of the frames of the 360-degree image or set the weights $w_1$ and $w_2$ at intervals of a predetermined number of frames.

Figure 10:
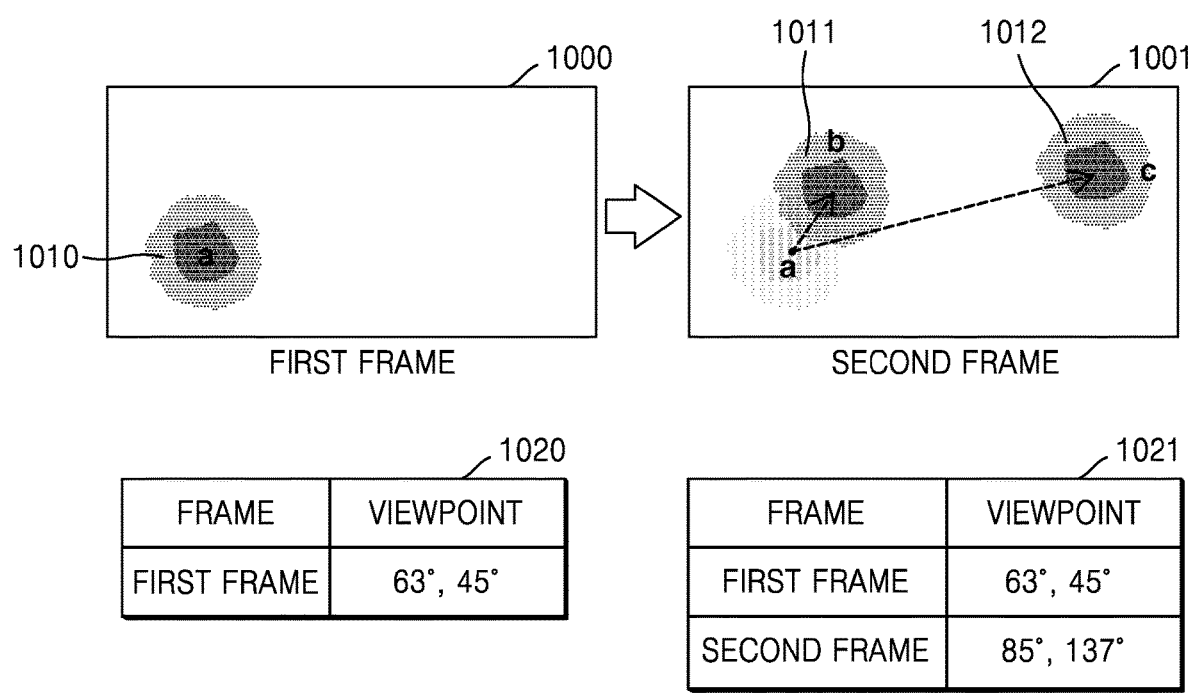
FIG. 10 is a diagram illustrating a method of determining a viewpoint to be recommended based on a viewpoint guide map, according to an exemplary embodiment.

FIG. 10 is a diagram illustrating a method of determining a viewpoint to be recommended based on a viewpoint guide map, according to an exemplary embodiment.

In one embodiment, the image display apparatus 100 may generate a list of recommended viewpoints based on a viewpoint guide map.

For example, viewpoints may be changed as a first frame is switched to a second frame. In this case, the first frame and the second frame may be consecutive (i.e., adjacent) frames or may be non-consecutive frames. For example, when a viewpoint guide map corresponding to frames sampled at intervals of a predetermined number of frames is generated, the first frame and the second frame may be non-consecutive frames.

The image display apparatus 100 may determine a viewpoint of a highest recommendation grade in a viewpoint guide map corresponding to the second frame to be a viewpoint to be recommended for the second frame. For example, in FIG. 10, a viewpoint of the first frame may be a point a 1010 of a highest recommendation grade in a viewpoint guide map 1000 corresponding to the first frame. Coordinates (63°, 45°) which represent a location of the point a 1010 may be stored in a list of recommended viewpoints 1020. When the first frame is switched to the second frame, the image display apparatus 100 may determine, as a viewpoint to be recommended, a point c 1012 of a highest recommendation grade in a viewpoint guide map 1001 corresponding to the second frame.

Alternatively, the image display apparatus 100 may determine a viewpoint to be recommended for the second frame by further taking into account the distance between the point a 1010 and the point c 1012. For example, when the distance between the point a 1010 and the point c 1012 is greater than or equal to a predetermined threshold value, a viewpoint moving distance may be considered large. Thus, when a user views a 360-degree image, the flow of a story thereof may be interrupted and the user may feel disoriented while viewing the 360-degree image. Thus, the image display apparatus 100 may determine a viewpoint to be recommended for the second frame by further taking into account the viewpoint's moving distance and/or speed.

For example, referring to FIG. 10, in the viewpoint guide map 1001 corresponding to the second frame, a point of a highest recommendation grade may be the point c 1012 and a point of a second highest recommendation grade may be the point b 1011. The distance between the point b 1011 and the point a 1010 which is the viewpoint of the first frame may be shorter than the distance between the point c 1012 and the point a 1010. When a predetermined condition is satisfied, the image display apparatus 100 may determine the point b 1011 as a viewpoint to be recommended for the second frame, instead of the point c 1012. For example, the image display apparatus 100 may determine the point b 1011 as a viewpoint to be recommended for the second frame, instead of the point c 1012 according to a result of performing calculation using Equation 3 below. However, the condition of determining that the point b 1011 as a viewpoint to be recommended for the second frame instead of the point c 1012 may vary according to various exemplary embodiments, and is not limited to the above description.

$$\underset{(x_{t+1}, y_{t+1})}{\mathrm{argmax}} (K(x_{t+1} - x_t, y_{t+1} - y_t) + M_g) \qquad \text{[Equation 3]}$$

In Equation 3, $(x_t, y_t)$ may represent the coordinates of a point representing the viewpoint of the first frame, and $(x_{t+1}, y_{t+1})$ may represent the coordinates of a point representing the viewpoint of the second frame. $M_g$ may represent a viewpoint guide map of the 360-degree image. K may represent a kernel function.

According to an exemplary embodiment, the image display apparatus 100 may determine, for example, a point having a highest value calculated using Equation 3 to be a viewpoint to be recommended for the second frame. For example, the image display apparatus 100 may compare a case in which a viewpoint to be recommended for the second frame according to Equation 3 is the point c 1012 with a case in which the viewpoint to be recommended for the second frame according to Equation 3 is the point b 1011, and determine the greater value of the point c 1012 and the point b 1011 to be a viewpoint to be recommended for the second frame. Furthermore, the image display apparatus 100 may store the coordinates of the point c 1012 or the point b 1011 representing the viewpoint to be recommended for the second frame in the list of recommended viewpoints 1021.

The kernel function may be any type of a kernel function, such as a two-dimensional (2D) Gaussian kernel function or a pyramid-shaped kernel function.

Figure 11:
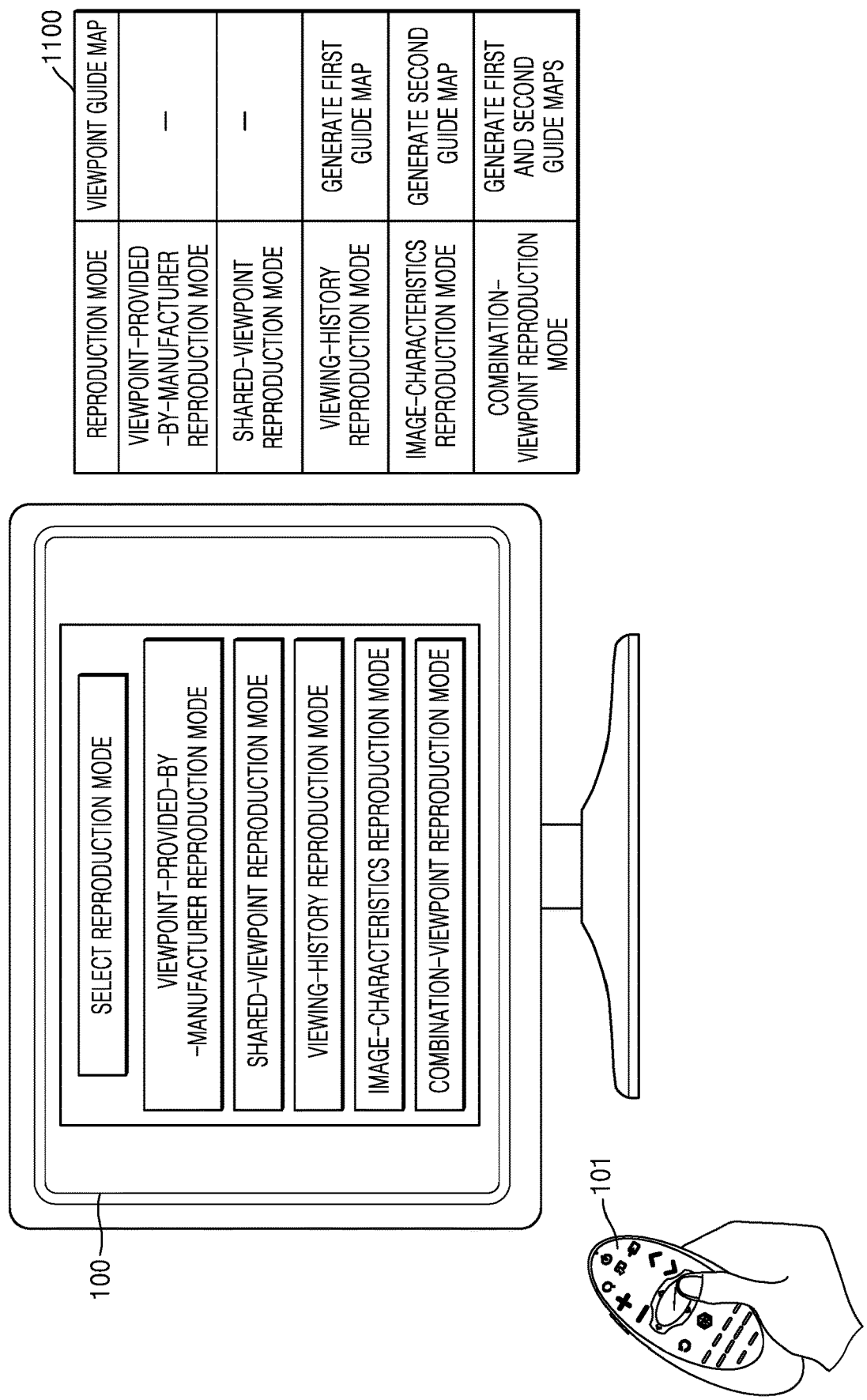
FIG. 11 is a diagram illustrating a method of differently generating a viewpoint guide map according to a reproduction mode, according to an exemplary embodiment.

FIG. 11 is a diagram illustrating a method of variously generating a viewpoint guide map according to a reproduction mode, according to an exemplary embodiment.

As shown in FIG. 11, an image display apparatus 100 may provide various reproduction modes (e.g., display modes) for reproducing a 360-degree image. For example, the image display apparatus 100 may provide various reproduction modes according to a condition of determining a viewpoint when the 360-degree image is reproduced.

For example, the image display apparatus 100 may provide a mode of reproducing the 360-degree image according to a list of recommended viewpoints provided by a manufacturer (i.e., a viewpoint-provided-by-manufacturer reproduction mode) or a mode in which a list of recommended viewpoints of a specific person is shared and the 360-degree image is reproduced based on the shared list of recommended viewpoints (i.e., a shared-viewpoint reproduction mode). Alternatively, the image display apparatus 100 may provide a mode of reproducing the 360-degree image based on a list of recommended viewpoints, which is generated based on only viewing-history data, according to a user's selection (i.e., a viewing-history reproduction mode), or a mode of reproducing the 360-degree image based on a list of recommended viewpoints generated by taking into account only characteristics of the 360-degree image (i.e., an image-characteristics reproduction mode). Alternatively, the image display apparatus 100 may provide a mode of reproducing the 360-degree image based on a list of recommended viewpoints, generated by taking into account both the viewing-history data and a result of analyzing the characteristics of the 360-degree image (i.e., a combination-viewpoint reproduction mode). However, a reproduction mode provided by the image display apparatus 100 is not limited to the above examples and may vary according to an embodiment.

According to an exemplary embodiment, the image display apparatus 100 may display a user interface for selecting a reproduction mode. Furthermore, the image display apparatus 100 may generate a viewpoint guide map 1100 corresponding to a reproduction mode, in response to a user input for selecting a reproduction mode through the user interface.

For example, when a user input for selecting the viewpoint-provided-by-manufacturer reproduction mode is received, the image display apparatus 100 may reproduce the 360-degree image based on a list of recommended viewpoints provided by a manufacturer. The manufacturer may refer to the producer of the 360-degree image content or a third-party such as a distributor of the content. When a user input for selecting the shared-viewpoint reproduction mode is received, the image display apparatus 100 may obtain a list of recommended viewpoints shared on the Internet and reproduce the 360-degree image based on the obtained list of recommended viewpoints. Thus, when the viewpoint-provided-by-manufacturer reproduction mode or the shared-viewpoint reproduction mode is selected, the image display apparatus 100 need not generate an additional viewpoint guide map.

When a user input for selecting the viewing-history reproduction mode is received, the image display apparatus 100 may generate a first guide map based on viewing-history data of the 360-degree image. In this case, the first guide map may be a viewpoint guide map of the 360-degree image. When a user input for selecting the image-characteristics reproduction mode is received, the image display apparatus 100 may generate a second guide map based on the result of analyzing the characteristics of the 360-degree image. In this case, the second guide map may be a viewpoint guide map of the 360-degree image. When a user input for selecting the combination-viewpoint reproduction mode is received, the image display apparatus 100 may generate a viewpoint guide map by generating a first guide map and a second guide map and respectively applying weights to the first guide map and the second guide map.

Figure 12A:
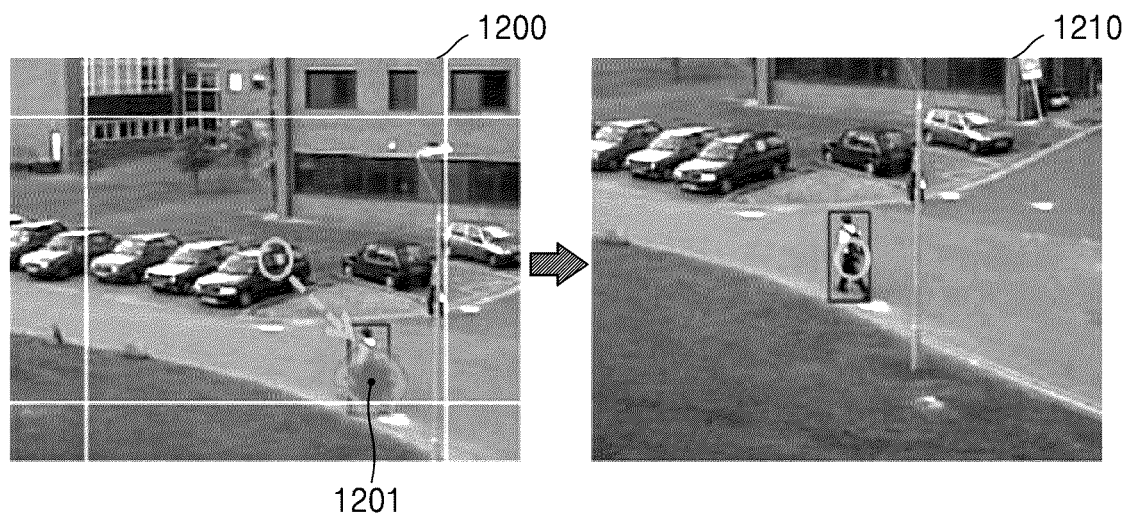
FIGS. 12A and 12B are diagrams illustrating cases in which a viewpoint is moved according to an exemplary embodiment.
Figure 12B:
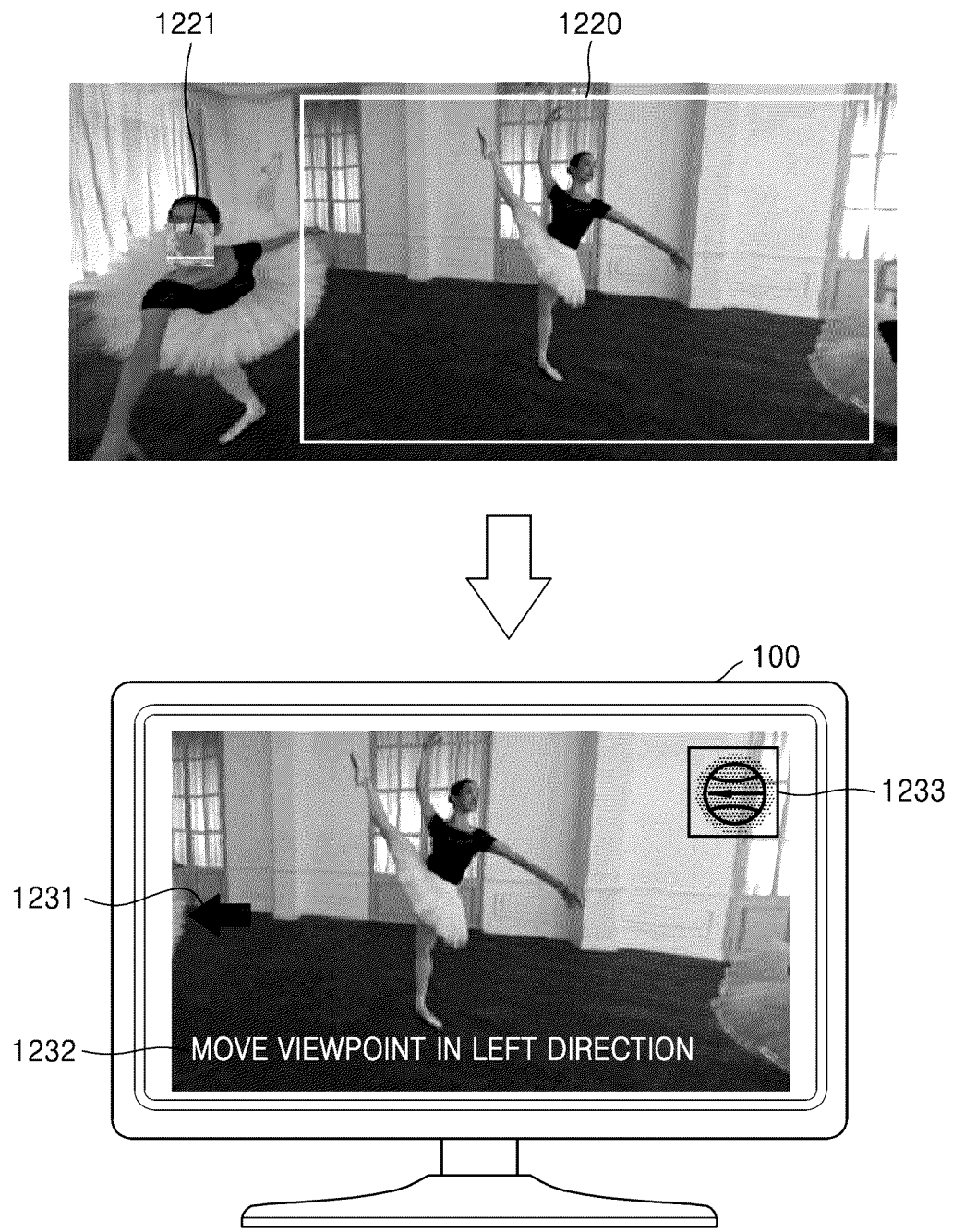

FIGS. 12A and 12B are diagrams illustrating cases in which a viewpoint is moved according to an exemplary embodiment.

As described above, the image display apparatus 100 may automatically reproduce a 360-degree image based on various reproduction modes. According to an exemplary embodiment, even when the 360-degree image is automatically reproduced, the image display apparatus 100 may change viewpoints according to a user input. However, after the viewpoint points are changed according to the user input, there may be a viewpoint with a recommendation grade greater than or equal to a threshold value in a viewpoint guide map. For example, an image 1200 of FIG. 12A corresponds to a changed viewpoint. A point 1201 representing another viewpoint with a recommendation grade greater than or equal to the threshold value may be present in the image 1200 corresponding to the changed viewpoint. Then the image display apparatus 100 may automatically change the changed viewpoint to the viewpoint with the recommendation grade greater than or equal to the threshold value, and display an image 1210 to the viewpoint with the recommendation grade greater than or equal to the threshold value.

In contrast, as shown in FIG. 12B, a point 1221 representing a viewpoint with a recommendation grade greater than or equal to a threshold value may be present outside an image 1220 corresponding to a changed viewpoint. In this case, the image display apparatus 100 may display information representing a location of the point 1221 representing the viewpoint with the recommendation grade greater than or equal to the threshold value. For example, in FIG. 12B, the image display apparatus 100 may display the location of the point 1221 representing the viewpoint with the recommendation grade greater than or equal to the threshold value by using an indicator (e.g., arrow) 1231, text 1232, and/or a simplified map 1233. Thus, even if a user changes viewpoints when the 360-degree image is automatically reproduced, the image display apparatus 100 may prevent the user from missing an important event occurring in the 360-degree image.

Figure 13:
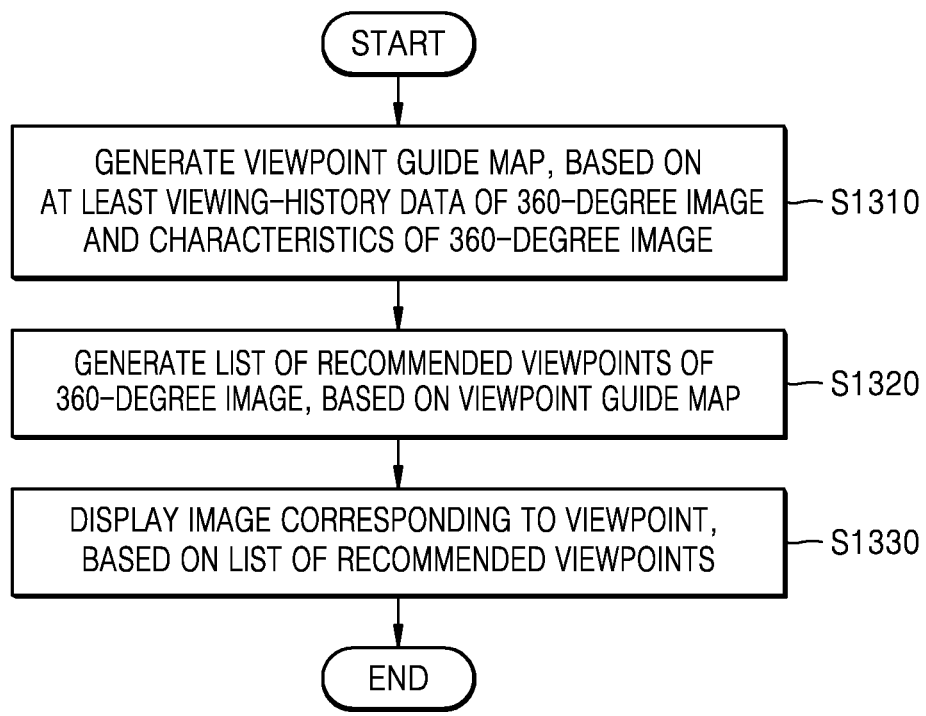
FIG. 13 is a flowchart of an image display method according to an exemplary embodiment.

FIG. 13 is a flowchart of an image display method according to an exemplary embodiment.

In operation S1310, the image display apparatus 100 generates a viewpoint guide map based on at least one of viewing-history data of a 360-degree image and a result of analyzing characteristics of the 360-degree image.

For example, the image display apparatus 100 may generate a first guide map based on the viewing-history data of the 360-degree image. The viewing-history data of the 360-degree image may be understood as viewing-history data provided by at least one viewing-history provider selected according to a predetermined condition. For example, the image display apparatus 100 may select at least one viewing-history provider based on at least one of a first characteristic of the 360-degree image and information regarding a user. Alternatively, a list of recommended viewpoints generated when a viewing-history provider views the 360-degree image may be obtained as the viewing-history data of the 360-degree image.

The image display apparatus 100 may generate a second guide map based on the result of analyzing the characteristics of the 360-degree image. The image display apparatus 100 may analyze the 360-degree image to obtain information regarding pixels of each of frames of the 360-degree image and information regarding a motion of an object detected in the 360-degree image. For example, the information regarding the pixels may include at least one among the colors, brightness, and gradients of the pixels of each of the frames of the 360-degree image and directionalities of the gradients. The information regarding the motion of the object detected in the 360-degree image may include at least one among, for example, information regarding displacement of the object, information regarding change in the size of the object, and information regarding time when the object appears in the 360-degree image.

The image display apparatus 100 may determine a highlight area based on at least one of the information regarding the pixels and the information regarding the motion of the object detected in the 360-degree image. The image display apparatus 100 may generate a second guide map by setting a recommendation grade of the highlight area to be higher than those of other areas.

The image display apparatus 100 may generate a viewpoint guide map by respectively applying weights to the first guide map and the second guide map. For example, the processor 310 may determine the weights, based on a distribution of recommendation grades in the first guide map, the first characteristic of the 360-degree image, and/or a cumulative number of times the 360-degree image has been viewed.

In operation S1320, the image display apparatus 100 generates a list of recommended viewpoints of the 360-degree image based on generated viewpoint guide map.

When a first frame is switched to a second frame, the image display apparatus 100 may determine a point of a highest recommendation grade in a viewpoint guide map corresponding to the second frame to be a viewpoint to be recommended for the second frame. According to an exemplary embodiment, the image display apparatus 100 may determine the viewpoint to be recommended for the second frame by further taking into account the distance between a point representing a viewpoint to be recommended for the first frame and the point of the highest recommendation grade in the viewpoint guide map corresponding to the second frame.

In operation S1330, the image display apparatus 100 displays an image corresponding to a viewpoint according to the list of recommended viewpoints.

Figure 14:
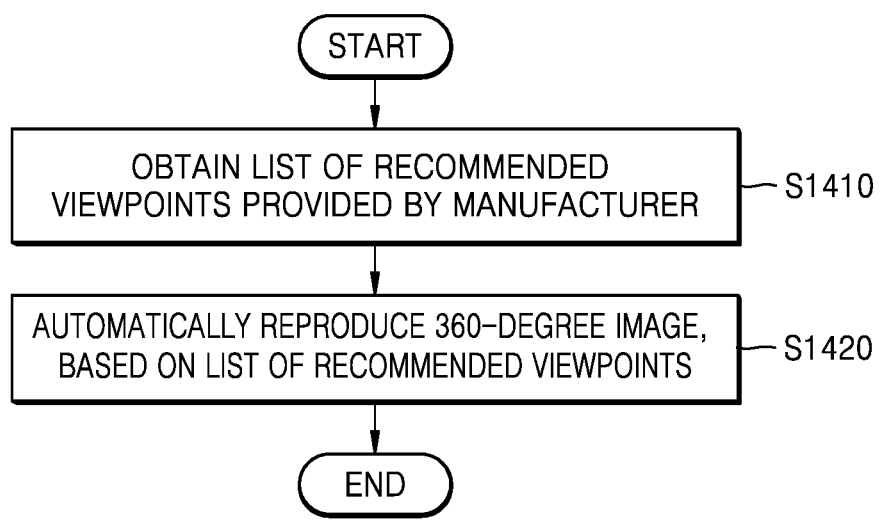
FIG. 14 is a flowchart of a method of automatically reproducing a 360-degree image based on a list of recommended viewpoints provided from a manufacturer, according to an exemplary embodiment.

FIG. 14 is a flowchart of a method of automatically reproducing a 360-degree image based on a list of recommended viewpoints provided from a manufacturer, according to an exemplary embodiment.

According to an exemplary embodiment, the image display apparatus 100 may automatically reproduce a 360-degree image based on a list of recommended viewpoints provided by a manufacturer.

In operation S1410, the image display apparatus 100 may obtain a list of recommended viewpoints provided by a manufacturer. The list of recommended viewpoints provided by the manufacturer may be provided in the form of meta data of the 360-degree image or be provided through a website managed by the manufacturer but is not limited thereto.

In operation S1420, the image display apparatus 100 may automatically reproduce the 360-degree image based on the list of recommended viewpoints provided by the manufacturer. Thus, a user may view the 360-degree image from a viewpoint intended by the manufacturer without manually changing viewpoints.

Figure 15:
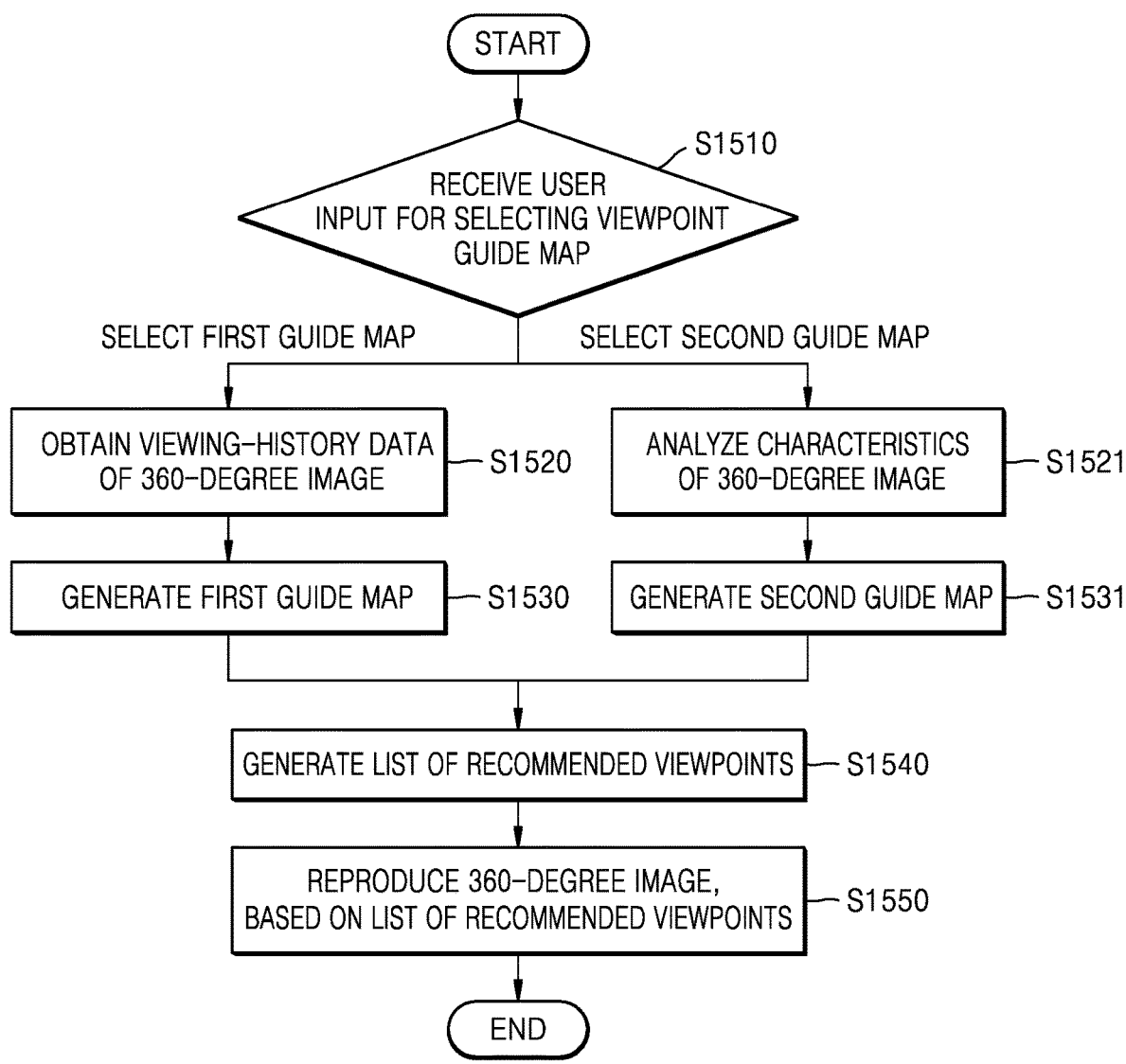
FIG. 15 is a flowchart of a method of automatically reproducing a 360-degree image according to an exemplary embodiment.

FIG. 15 is a flowchart of a method of automatically reproducing a 360-degree image according to an exemplary embodiment.

According to an exemplary embodiment, the image display apparatus 100 may receive a user input for selecting a first guide map or a second guide map and generate a viewpoint guide map according to the user input. Furthermore, the image display apparatus 100 may generate a list of recommended viewpoints from the viewpoint guide map and automatically reproduce a 360-degree image based on the list of recommended viewpoints.

In operation S1510, the image display apparatus 100 may receive a user input for selecting a viewpoint guide map. For example, the image display apparatus 100 may receive a user input for selecting the first guide map or the second guide map.

In operation S1520, when the first guide map is selected, the image display apparatus 100 may obtain viewing-history data of the 360-degree image. For example, the viewing-history data may be stored in the memory of the image display apparatus 100 or an Internet server. In operation S1530, the image display apparatus 100 may generate the first guide map based on the viewing-history data. In this case, the first guide map may be a viewpoint guide map of the 360-degree image.

In operation S1521, when the second guide map is selected, the image display apparatus 100 may analyze characteristics of the 360-degree image. As described above, the image display apparatus 100 may analyze information regarding pixels of each of frames of the 360-degree image and/or information regarding a motion of a detected object. In operation S1531, the image display apparatus 100 may generate the second guide map based on a result of analyzing the characteristics of the 360-degree image. In this case, the second guide map may be the viewpoint guide map of the 360-degree image.

In operation S1540, the image display apparatus 100 may generate a list of recommended viewpoints from the viewpoint guide map.

In operation S1550, the image display apparatus 100 may automatically reproduce the 360-degree image based on the list of recommended viewpoints.

Figure 16:
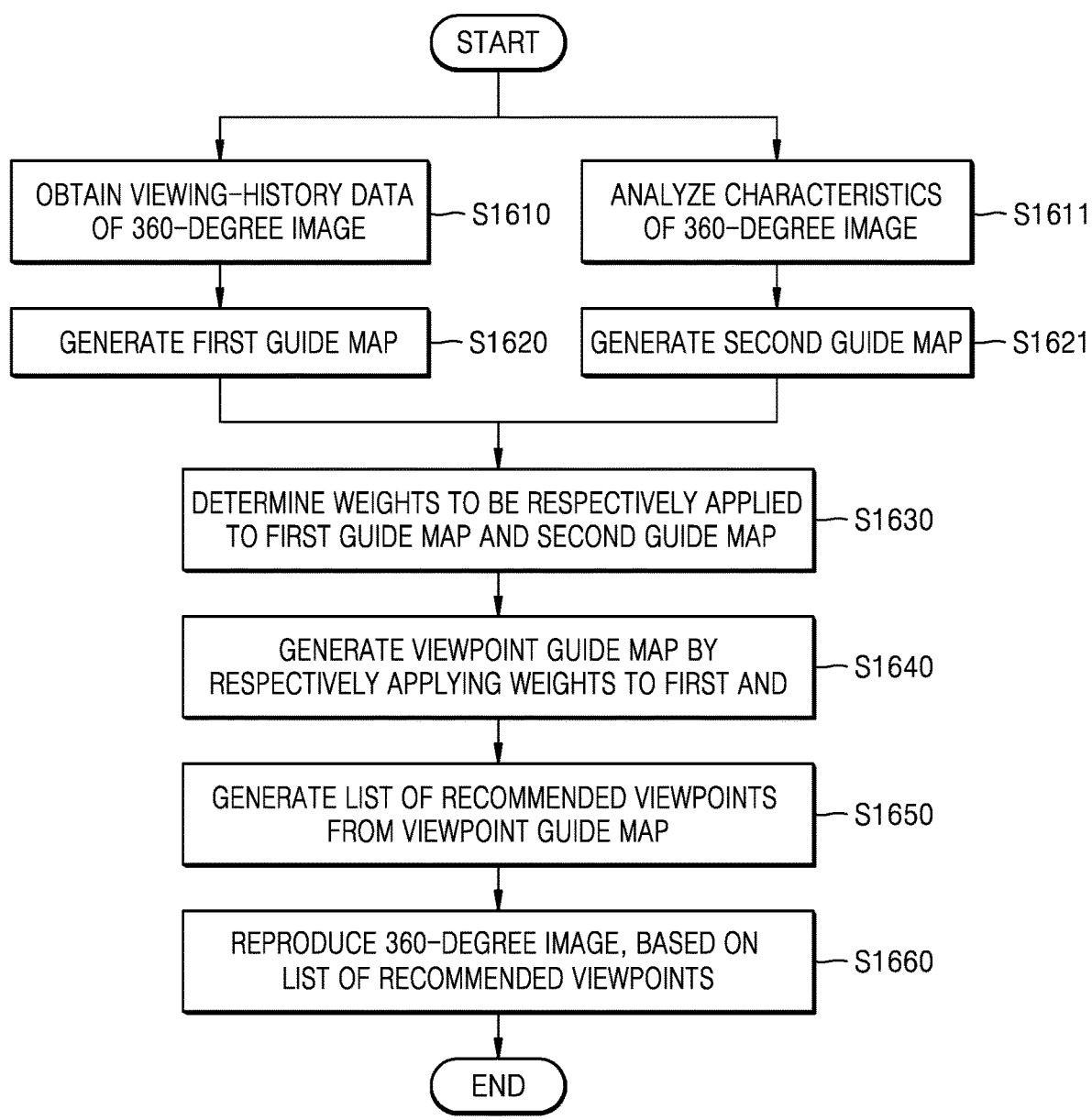
FIG. 16 is a flowchart of a method of automatically reproducing a 360-degree image according to an exemplary embodiment.

FIG. 16 is a flowchart of a method of automatically reproducing a 360-degree image according to an exemplary embodiment.

According to an exemplary embodiment, the image display apparatus 100 may generate a viewpoint guide map and a list of recommended viewpoints based on viewing-history data of a 360-degree image and a result of analyzing characteristics of the 360-degree image.

In operation S1610, the image display apparatus 100 may obtain the viewing-history data of the 360-degree image. In operation S1620, the image display apparatus 100 may generate a first guide map based on the viewing-history data of the 360-degree image.

In operation S1611, the image display apparatus 100 may obtain the result of analyzing the characteristics of the 360-degree image. In operation S1621, the image display apparatus 100 may generate a second guide map based on the result of analyzing the characteristics of the 360-degree image.

In operation S1630, the image display apparatus 100 may determine weights to be respectively applied to the first guide map and the second guide map.

For example, when recommendation grades are distributed in a wide area of the first guide map, the image display apparatus 100 may set the weight to be applied to the first guide map to be less than the weight to be applied to the second guide map.

For example, when the 360-degree image is content having a storyline, such as a movie or a drama (e.g., a TV show), the image display apparatus 100 may set the weight to be applied to the first guide map to be greater than that to be applied to the second guide map. Alternatively, when the 360-degree image is an image in which detection of an occurring event is important, such as a surveillance camera image or a dashboard camera image, the image display apparatus 100 may set the weight to be applied to the second guide map to be greater than that to be applied to the first guide map.

In operation S1640, the image display apparatus 100 may generate a viewpoint guide map of the 360-degree image by respectively applying the weights to the first and second guide maps.

In operation S1650, the image display apparatus 100 may generate a list of recommended viewpoints based on the viewpoint guide map.

In operation S1660, image display apparatus 100 may automatically reproduce the 360-degree image, based on the list of recommended viewpoints.

Figure 17A:
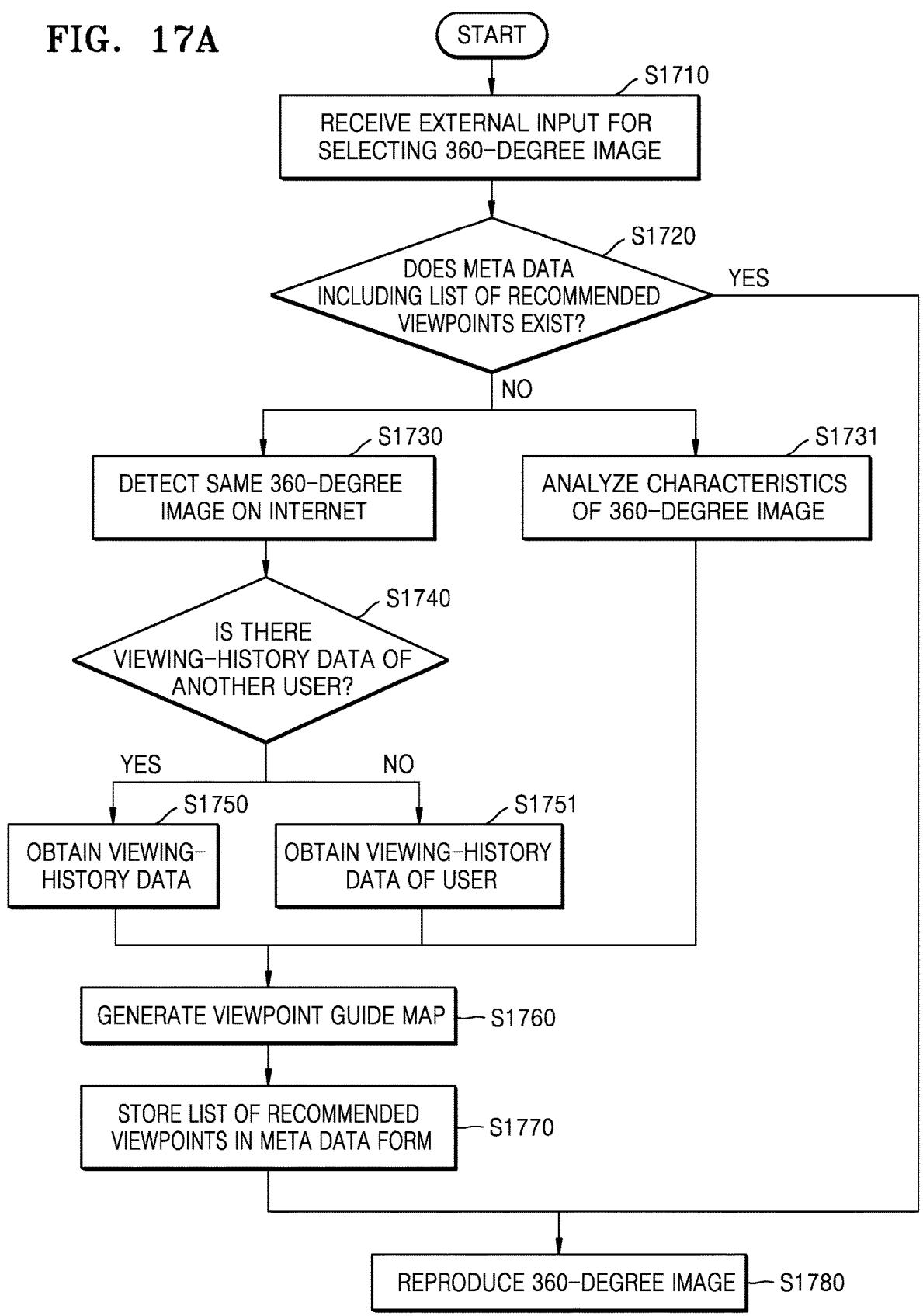
FIGS. 17A and 17B are flowcharts of a method of reproducing a 360-degree image and a method of streaming a 360-degree image according to an exemplary embodiment.

FIG. 17A is a flowchart of a method of reproducing a 360-degree image according to an exemplary embodiment.

In operation S1710, the image display apparatus 100 may receive an external input for selecting a 360-degree image. For example, the image display apparatus 100 may receive an external input for selecting one of a plurality of 360-degree images stored in an internal memory of the image display apparatus 100 or selecting a 360-degree image stored in an external storage medium connected to image display apparatus 100.

In operation S1720, the image display apparatus 100 may retrieve metadata including a list of recommended viewpoints of the selected 360-degree image.

When the metadata including the list of recommended viewpoints is retrieved, the image display apparatus 100 may automatically reproduce the 360-degree image, based on the list of recommended viewpoints included in the metadata. However, when the metadata of the list of recommended viewpoints is not retrieved, the image display apparatus 100 may detect the same 360-degree image on the Internet (S1730) and detect whether there is viewing-history data of another user (S1740). In addition, when the metadata of the list of recommended viewpoints is not detected, the image display apparatus 100 may analyze the characteristics of the 360-degree image (S1731).

When viewing-history data of another user is retrieved, the image display apparatus 100 may obtain the viewing-history data (S1750). However, when viewing-history data of another user is not retrieved, the image display apparatus 100 may obtain viewing-history data of the user, stored in the internal memory of the image display apparatus 100 (S1751).

In operation S1760, the image display apparatus 100 may generate a viewpoint guide map based on either the viewing-history data of the other user or the viewing-history data of the user, and a result of analyzing characteristics of the 360-degree image, and generate a list of recommended viewpoints based on the viewpoint guide map.

In operation S1770, the image display apparatus 100 may store the list of recommended viewpoints in the form of metadata. Thereafter, in operation S1780, the image display apparatus 100 may automatically reproduce the 360-degree image, based on the list of recommended viewpoints.

According to an exemplary embodiment, the image display apparatus 100 may locally reproduce the 360-degree image as illustrated in FIG. 17A but may stream the 360-degree image via the Internet.

Figure 17B:
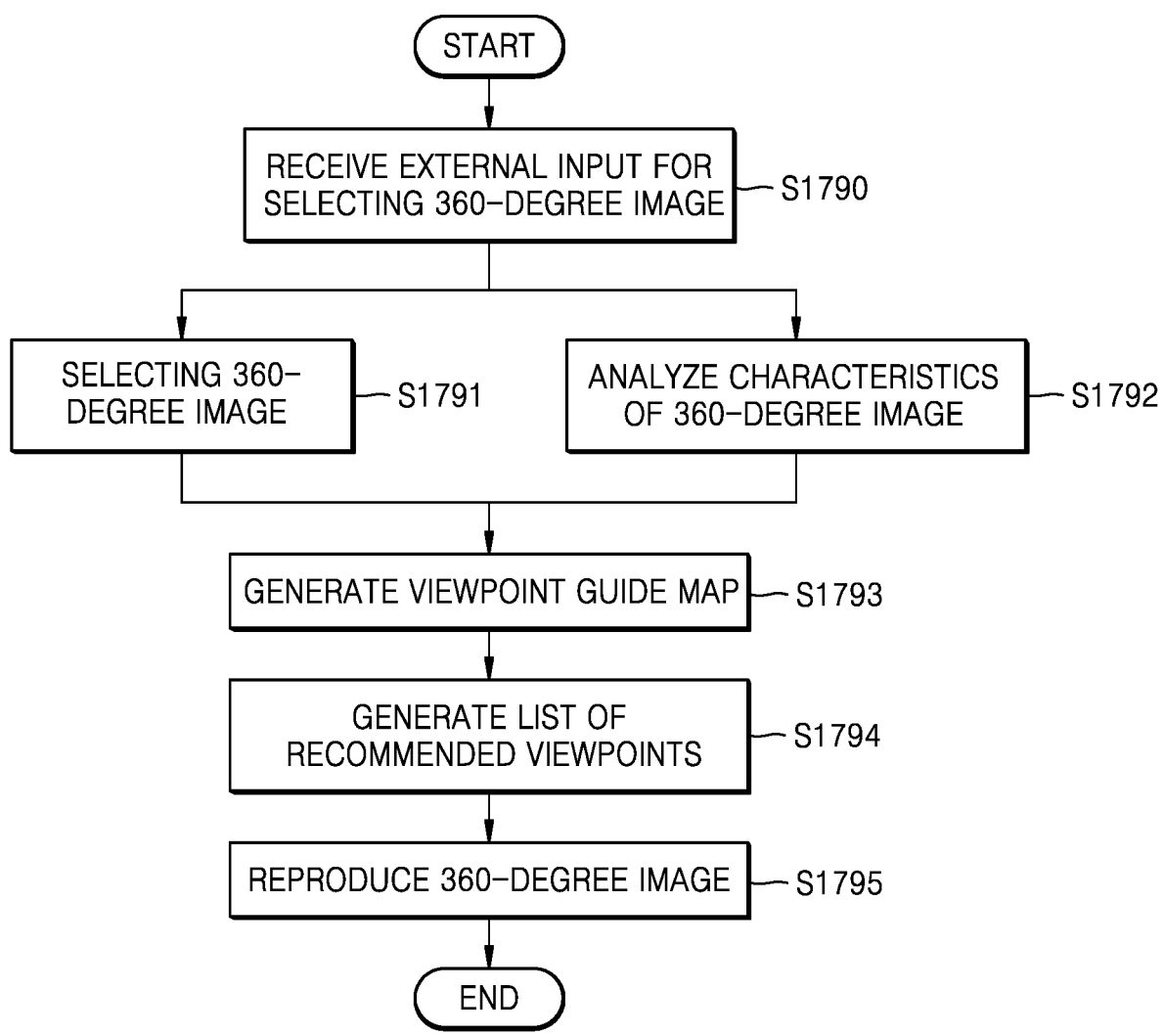

FIG. 17B is a flowchart of a method of streaming a 360-degree image according to an exemplary embodiment.

In operation S1790, the image display apparatus 100 may receive an input for selecting a 360-degree image on the Internet.

In operation S1791, the image display apparatus 100 may obtain viewing-history data of the selected 360-degree image. For example, when the 360-degree image is reproduced at a site providing a streaming service, the image display apparatus 100 may obtain the viewing-history data of the selected 360-degree image from a server of the site.

In operation S1792, the image display apparatus 100 may obtain a result of analyzing characteristics of the selected 360-degree image. For example, the image display apparatus 100 may analyze the characteristics of the 360-degree image in real time or may load a result of analyzing the characteristics of the 360-degree image, stored beforehand in the server.

In operation S1793, the image display apparatus 100 may generate a viewpoint guide map based on the viewing-history data of the 360-degree image and the result of analyzing the characteristics of the 360-degree image. In operation S1794, the image display apparatus 100 may generate a list of recommended viewpoints based on of the viewpoint guide map.

In operation S1795, the image display apparatus 100 may automatically reproduce the 360-degree image, based on the list of recommended viewpoints.

The various exemplary embodiments set forth herein may be embodied as program commands executable through various computer means and recorded on a computer-readable recording medium. The computer-readable recording medium may include a program command, a data file, and a data structure solely or in combination. The program commands recorded on the computer-readable recording medium may be specifically designed and configured for the exemplary embodiments, or may be well known to and usable by one of ordinary skill in the art of computer software. Examples of the computer-readable recording medium include magnetic media (e.g., hard disks, floppy disks, and magnetic tapes), optical media (e.g., compact disc read-only memories (CD-ROMs) and digital versatile discs (DVDs)), magneto-optical media (e.g., floptical disks), and hardware devices specifically configured to store and execute program commands (e.g., read-only memories (ROMs), random access memories (RAMs), and flash memories). Examples of the program commands include not only machine language codes prepared by a compiler, but also high-level language codes executable by a computer by using an interpreter.

The above description of exemplary embodiments is provided for the purpose of illustration, and it would be understood by those skilled in the art that various changes and modifications may be made without changing the technical conception and essential features of the present disclosure. Thus, it is clear that the above embodiments are illustrative in all aspects and do not limit the present disclosure. For example, each component described to be of a single type can be implemented in a distributed manner. Similarly, each component described to be distributed may be combined together.

The scope of the present disclosure is defined not by the detailed description of the present disclosure but by the appended claims, and all changes or modifications derived from the meanings and scope of the claims and equivalents of the claims should be construed as being included in the scope of the present disclosure.

What is claimed is:

1. An image display apparatus comprising:
a display; and
a processor configured to:
generate a viewpoint guide map, which represents a degree of recommendation of each viewpoint in a frame, based on at least one of viewing-history data of a 360-degree image and characteristics of the 360-degree image,
generate a list of recommended viewpoints, including viewpoints to be recommended for a plurality of frames, for the 360-degree image based on the viewpoint guide map, and
control the display to display an image included in the 360-degree image corresponding to a viewpoint from among the list of recommended viewpoints,
wherein the processor is further configured to determine a highlight area, based on at least one of information regarding a plurality of pixels of each of frames of the 360-degree image and information regarding a motion of an object detected in the 360-degree image, and generate the viewpoint guide map by setting a recommendation grade of the highlight area to be higher than recommendation grades of other areas,
wherein the information regarding the plurality of pixels comprises at least one from among colors, brightness, gradients, and directions of the gradients of the plurality of pixels of each of the frames of the 360-degree image, and
wherein the information regarding the motion of the object detected in the 360-degree image comprises at least one from among information regarding displacement of the object, information regarding change in size of the object, and information regarding time when the object appears in the 360-degree image.

2. The image display apparatus of claim 1, wherein the viewpoint guide map corresponds to the frame from among a plurality of frames of the 360-degree image.

3. The image display apparatus of claim 1, wherein the processor is further configured to control the display to display a user interface for selecting a reproduction mode, and generate the viewpoint guide map in response to a user input for selecting the reproduction mode through the user interface.

4. The image display apparatus of claim 1, wherein the processor is further configured to:
select at least one viewing-history provider, based on at least one of a first characteristic of the 360-degree image and information regarding the user,
obtain as the viewing-history data of the 360-degree image the list of recommended viewpoints generated in response to the at least one viewing-history provider viewing the 360-degree image, and
generate the viewpoint guide map based on the viewing-history data of the 360-degree image.

5. The image display apparatus of claim 1, wherein the processor is further configured to generate a first guide map based on the viewing-history data of the 360-degree image, generate a second guide map based on the characteristics of the 360-degree image, and generate the viewpoint guide map by respectively applying weights to the first guide map and the second guide map.

6. The image display apparatus of claim 5, wherein the processor is further configured to determine the weights, based on at least one from among a distribution of recommendation grades in the first guide map, a second characteristic of the 360-degree image, and a cumulative number of viewing times the 360-degree image.

7. The image display apparatus of claim 1, wherein, for a first frame and a second frame of the 360-degree image, the processor determines a viewpoint to be recommended for the second frame based on at least one of a point of a highest recommendation grade in a viewpoint guide map corresponding to the second frame and a distance between the point of the highest recommendation grade in the viewpoint guide map corresponding to the second frame and a point representing a viewpoint of the first frame.

8. The image display apparatus of claim 1, wherein, when the 360-degree image is reproduced in response to a user's input, the processor is further configured to generate the viewpoint guide map based on the viewing-history data generated when the user views the 360-degree image and a second guide map generated based on the characteristics of the 360-degree image.

9. The image display apparatus of claim 1, wherein the processor is further configured to control the display to display a second image corresponding to a second viewpoint changed in response to a user input for changing viewpoints, and to display information representing a location of a third viewpoint of a recommendation grade higher than or equal to a threshold value in the viewpoint guide map as the third viewpoint of the recommendation grade higher than or equal to the threshold value is located outside the second image corresponding to the second viewpoint.

10. An image display method comprising:
generating a viewpoint guide map, which represents a degree of recommendation of each viewpoint in a frame, based on at least one of viewing-history data of a 360-degree image and characteristics of the 360-degree image;
generating a list of recommended viewpoints, including viewpoints to be recommended for a plurality of frames, for the 360-degree image based on the viewpoint guide map; and
displaying an image included in the 360-degree image corresponding to a viewpoint from among the list of recommended viewpoints,
wherein the generating the viewpoint guide map comprises:
determining a highlight area, based on at least one of information regarding a plurality of pixels of each of frames of the 360-degree image and information regarding a motion of an object detected in the 360-degree image; and
generating the viewpoint guide map by setting a recommendation grade of the highlight area to be higher than recommendation grades of other areas,
wherein the information regarding the plurality of pixels comprises at least one from among colors, brightness, gradients, and directions of the gradients of the plurality of pixels of each of the frames of the 360-degree image, and
wherein the information regarding the motion of the object detected in the 360-degree image comprises at least one from among information regarding a displacement of the object, information regarding a change in size of the object, and information regarding time when the object appears in the 360-degree image.

11. The image display method of claim 10, wherein the generating the viewpoint guide map comprises:
displaying a user interface for selecting a reproduction mode; and
generating the viewpoint guide map, in response to a user input for selecting the reproduction mode through the user interface.

12. The image display method of claim 10, wherein the generating the viewpoint guide map comprises:
selecting at least one viewing-history provider, based on at least one of a first characteristic of the 360-degree image and information regarding the user;
obtaining as the viewing-history data of the 360-degree image the list of recommended viewpoints generated in response to the at least one viewing-history provider viewing the 360-degree image; and
generating the viewpoint guide map based on the viewing-history data of the 360-degree image.

13. The image display method of claim 10, wherein the generating the viewpoint guide map comprises:
generating a first guide map based on the viewing-history data of the 360-degree image;
generating a second guide map based on the characteristics of the 360-degree image; and
generating the viewpoint guide map by respectively applying weights to the first guide map and the second guide map.

14. The image display method of claim 13, wherein the generating the viewpoint guide map further comprises determining the weights based on at least one from among a distribution of recommendation grades in the first guide map, a second characteristic of the 360-degree image, and a cumulative viewing count of the 360-degree image.

15. The image display method of claim 10, wherein, for a first frame and a second frame of the 360-degree image, the generating the list of recommended viewpoints comprises determining a viewpoint to be recommended for the second frame based on at least one of a point of a highest recommendation grade in a viewpoint guide map corresponding to the second frame and a distance between the point of the highest recommendation grade in the viewpoint guide map corresponding to the second frame and a point representing a viewpoint of the first frame.

16. A non-transitory computer-readable recording medium having recorded thereon a program for performing an image display method comprising:
generating a viewpoint guide map, which represents a degree of recommendation of each viewpoint in a frame, based on viewing-history data of a 360-degree image and characteristics of the 360-degree image;
generating a list of recommended viewpoints, including viewpoints to be recommended for a plurality of frames, for the 360-degree image based on the viewpoint guide map; and
displaying an image included in the 360-degree image corresponding to a viewpoint from among the list of recommended viewpoints,
wherein the generating the viewpoint guide map comprises:
determining a highlight area, based on at least one of information regarding a plurality of pixels of each of frames of the 360-degree image and information regarding a motion of an object detected in the 360-degree image; and
generating the viewpoint guide map by setting a recommendation grade of the highlight area to be higher than recommendation grades of other areas,
wherein the information regarding the plurality of pixels comprises at least one from among colors, brightness, gradients, and directions of the gradients of the plurality of pixels of each of the frames of the 360-degree image, and
wherein the information regarding the motion of the object detected in the 360-degree image comprises at least one from among information regarding a displacement of the object, information regarding a change in size of the object, and information regarding time when the object appears in the 360-degree image.

* * * * *